United States Patent
O'Neill et al.

(10) Patent No.: US 9,490,475 B2
(45) Date of Patent: Nov. 8, 2016

(54) HIGH ENERGY CATHODE FOR A BATTERY

(71) Applicant: Wildcat Discovery Technologies, Inc., San Diego, CA (US)

(72) Inventors: Cory O'Neill, San Diego, CA (US); Steven Kaye, San Diego, CA (US); Marissa Caldwell, San Diego, CA (US); David Keogh, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 116 days.

(21) Appl. No.: 14/455,281

(22) Filed: Aug. 8, 2014

(65) Prior Publication Data

US 2014/0349182 A1 Nov. 27, 2014

Related U.S. Application Data

(63) Continuation-in-part of application No. PCT/US2014/028271, filed on Mar. 14, 2014, which is a continuation of application No. 13/831,924, filed on Mar. 15, 2013, now Pat. No. 9,099,735, which is (Continued)

(51) Int. Cl.
*H01M 4/00* (2006.01)
*H01M 4/04* (2006.01)
(Continued)

(52) U.S. Cl.
CPC ........... *H01M 4/0471* (2013.01); *H01B 1/122* (2013.01); *H01M 4/0402* (2013.01); *H01M 4/08* (2013.01); *H01M 4/366* (2013.01); *H01M 4/505* (2013.01); *H01M 4/525* (2013.01); *H01M 4/582* (2013.01); *H01M 4/5825* (2013.01); *H01M 4/624* (2013.01); *H01M 4/625* (2013.01);

(Continued)

(58) Field of Classification Search
CPC .. H01M 4/366; H01M 4/382; H01M 4/5835; H01M 4/624
USPC .............................................. 429/212; 427/58
See application file for complete search history.

(56) References Cited

U.S. PATENT DOCUMENTS

| 6,346,349 B1 | 2/2002 | Briscoe et al. |
| 7,651,647 B1 | 1/2010 | Strange et al. |

(Continued)

FOREIGN PATENT DOCUMENTS

| KR | 1020060109305 A | 10/2006 |
| KR | 1020070117826 A | 12/2007 |

(Continued)

OTHER PUBLICATIONS

Arbizzani et al, "Li1.01Mn1.97O4 surface modification by poly(3,4-ethylenedioxythiophene)," Journal of Power Sources 119-121 (2003) 695-700.

(Continued)

*Primary Examiner* — Cynthia H Kelly
*Assistant Examiner* — Monique Wills
(74) *Attorney, Agent, or Firm* — Corridor Law Group, P.C.

(57) ABSTRACT

An electrode for an electrochemical cell including a metal fluoride containing active electrode material and an intrinsically conductive coating wherein the coating is applied to the active electrode material by heating the mixture for a time and at a temperature that limits degradation of the cathode active material. The active material can be a hybrid material formed from the reaction of a metal fluoride and a metal complex.

24 Claims, 21 Drawing Sheets

Related U.S. Application Data a continuation-in-part of application No. 13/612,800, filed on Sep. 12, 2012, application No. 14/455,281, filed on Aug. 8, 2014, which is a continuation-in-part of application No. PCT/US2014/028506, filed on Mar. 14, 2014.

(60) Provisional application No. 61/621,205, filed on Apr. 6, 2012, provisional application No. 61/533,911, filed on Sep. 13, 2011, provisional application No. 61/786,602, filed on Mar. 15, 2013.

(51) Int. Cl.

| | |
|---|---|
| H01M 4/62 | (2006.01) |
| H01M 4/58 | (2010.01) |
| H01M 4/36 | (2006.01) |
| H01B 1/12 | (2006.01) |
| H01M 4/08 | (2006.01) |
| H01M 4/505 | (2010.01) |
| H01M 4/525 | (2010.01) |
| H01M 4/583 | (2010.01) |
| H01M 4/38 | (2006.01) |

(52) U.S. Cl.
CPC ............ *H01M 4/382* (2013.01); *H01M 4/583* (2013.01); *H01M 4/5835* (2013.01); *Y02E 60/122* (2013.01); *Y02P 70/54* (2015.11)

(56) References Cited

U.S. PATENT DOCUMENTS

| | | |
|---|---|---|
| 2003/0027049 A1 | 2/2003 | Barker et al. |
| 2004/0140458 A1 | 7/2004 | Ravet et al. |
| 2006/0019163 A1 | 1/2006 | Amatucci et al. |
| 2007/0243466 A1 | 10/2007 | Amatucci et al. |
| 2008/0199772 A1 | 8/2008 | Amatucci et al. |
| 2009/0035204 A1 | 2/2009 | Xu et al. |
| 2009/0220858 A1* | 9/2009 | Cheng ................. C01G 23/002 429/220 |
| 2010/0035155 A1 | 2/2010 | Okada et al. |
| 2010/0059706 A1 | 3/2010 | Dai et al. |
| 2010/0129713 A1 | 5/2010 | Yazami et al. |
| 2010/0297496 A1 | 11/2010 | Ravet et al. |
| 2011/0086273 A1 | 4/2011 | Ravet et al. |
| 2011/0159360 A1 | 6/2011 | Hirota et al. |
| 2011/0212365 A1 | 9/2011 | Audemer et al. |
| 2011/0229761 A1 | 9/2011 | Cui et al. |
| 2012/0058397 A1 | 3/2012 | Zhamu et al. |
| 2012/0177991 A1* | 7/2012 | Mogi .................... H01G 11/38 429/211 |
| 2013/0059193 A1* | 3/2013 | Scordilis-Kelley ..... H01M 4/62 429/156 |
| 2013/0065126 A1 | 3/2013 | Caldwell et al. |

FOREIGN PATENT DOCUMENTS

| | | |
|---|---|---|
| WO | 2008100002 A1 | 8/2008 |
| WO | 2012137572 A1 | 10/2012 |

OTHER PUBLICATIONS

Hu et al, "Electrochemical Performance of Sol-Gel Synthesized LiFePO4 in Lithium Batteries," Journal of the Electrochemical Society, 151 (8) A1279-A1285 (2004).
International Search Report and Written Opinion for PCT/US2014/028271 dated Aug. 11, 2014.
International Search Report and Written Opinion issued in connection with PCT/2012/054953 on Jan. 31, 2013.
International Search Report for PCT/US2014/028478 Aug. 14, 2014.
International Search Report for PCT/US2014/028506 Jul. 25, 2014.
Liu, Li et al., "Excellent cycle performance of Co-doped FeF3/C nanocomposite cathode material for lithium-ion batteries," J. Mater. Chem., 2012, 22, 17539.
Liu, Xiu-Ming et al., "Effects of MoO3 encapsulating on performances of CuF2 cathode material for application of lithium primary batteries," The Chinese Journal of Nonferrous Metals, Feb. 2010, vol. 20 No. 2, 288-292.
Mansour, A.N. et al., "In situ X-ray absorption spectroscopic investigation of the electrochemical conversion reactions of CuF2—MoO3 nano composite," Journal of Solid State Chemistry 183 (2010) 3029-3038; Oct. 8, 2010.
Meduri et al, "Hybrid CFx—Ag2V4O11 as a high-energy, power density cathode for application in an underwater acoustic microtransmitter," Electrochem. Commun. (2011), doi:10.1016/j.elecom.2011.08.006.
Zhang et al, "Carbon-coated fluorinated graphite for high energy and high power densities primary lithium batteries," Journal of Power Sources 195 (2010) 2914-2917.

* cited by examiner

HIGH ENERGY CATHODE FOR A BATTERY

CROSS-REFERENCE TO RELATED APPLICATIONS

This application is a continuation-in-part of copending International Application No. PCT/US2014/028271, having an international filing date of Mar. 14, 2014 entitled "Cathode for a Battery," which in turn claims priority to copending U.S. application Ser. No. 13/831,924 filed Mar. 15, 2013 entitled "Cathode for a Battery," which is a continuation-in-part of co-pending U.S. application Ser. No. 13/612,800 filed Sep. 12, 2012 entitled "Cathode for a Battery," which in turn claims priority to and the benefit of U.S. Provisional Application No. 61/533,911 filed Sep. 13, 2011 entitled "Cathode for Metal-Fluoride Battery" and U.S. Provisional Application No. 61/621,205 filed Apr. 6, 2012 entitled "Cathode for a Battery."

This application is a continuation-in-part of International Application No. PCT/US2014/028506, having an international filing date of Mar. 14, 2014 entitled "High Energy Materials For A Battery And Methods For Making And Use," which claims priority to U.S. Provisional Application No. 61/786,602 filed Mar. 15, 2013 entitled "High Energy Materials For A Battery And Methods For Making And Use."

This application claims priority to and the benefit of each of these above applications, and each application is incorporated herein by reference in its entirety.

BACKGROUND OF THE INVENTION

The present invention is in the field of battery technology and, more particularly, in the area of using coatings to enhance electrolyte and electrode performance in batteries including high-energy electrodes metal-fluoride, carbon-fluoride, or oxide-based electrode materials.

One type of battery consists of a negative electrode made primarily from lithium and a positive electrode made primarily from a compound containing carbon and fluorine. During discharge, lithium ions and electrons are generated from oxidation of the negative electrode while fluoride ions and carbon are produced from reduction of the positive electrode. The generated fluoride ions react with lithium ions near the positive electrode to produce a compound containing lithium and fluorine, which may deposit at the positive electrode surface.

Metal fluoride based batteries are an attractive energy storage technology because of their extremely high theoretical energy densities. For example, certain metal fluoride active materials can have theoretical energy densities greater than about 1600 Wh/kg or greater than about 7500 Wh/L. Further, metal fluorides have a relatively low raw material cost, for example less than about $10/kg. However, a number of technical challenges currently limit their widespread use and realization of their performance potential.

One challenge for certain metal fluoride materials is comparatively poor rate performance. Many metal fluoride active materials have electrochemical potentials greater than about 2.5 V because of their relatively large bandgap produced by the highly ionic bonding between the metal and fluorine, and in particular between a transition metal and fluorine. Unfortunately, one of the drawbacks to wide bandgap materials is the intrinsically low electronic conductivity that results from the wide bandgap. As a result of this low conductivity, discharge rates of less than 0.1 C are required in order to obtain full theoretical capacity. More typically, discharge rates of 0.05 C to 0.02 C are reported in the literature. Such low discharge rates limit the widespread use of metal fluoride active materials.

Another challenge for certain metal fluoride active materials is a significant hysteresis observed between the charge and discharge voltages during cycling. This hysteresis is typically on the order of about 1.0V to about 1.5V. While the origin of this hysteresis is uncertain, current evidence suggests that kinetic limitations imposed by low conductivity play an important role. Further, asymmetry in the reaction paths upon charge and discharge may also play a role. Since the electrochemical potential for many of the metal fluorides is on the order of 3.0V, this hysteresis of about 1.0V to about 1.5V limits the overall energy efficiency to approximately 50%.

Limited cycle life is another challenge for certain metal fluoride active materials. Although rechargeability has been demonstrated for many metal fluoride active materials, their cycle life is typically limited to tens of cycles and is also subject to rapid capacity fade. Two mechanisms are currently believed to limit the cycle life for the metal fluoride active materials: agglomeration of metallic nanoparticles and mechanical stress due to volume expansion. It is believed that metal fluoride active materials can cycle by virtue of the formation during lithiation of a continuous metallic network within a matrix of insulating LiF. As the number of cycles increases, the metal particles tend to accumulate together into larger, discrete particles. The larger agglomerated particles in turn create islands that are electrically disconnected from one another, thus reducing the capacity and ability to cycle the metal fluoride active materials. The second limitation to extended cycle life is the mechanical stress imparted to the binder materials by the metal fluoride particles as a result of the volume expansion that occurs during the conversion reaction. Over time, the binder is pulverized, compromising the integrity of the cathode. Notably, for the metal fluoride $CuF_2$, no demonstrations of rechargeability have been reported.

For $CuF_2$, an additional challenge prevents rechargeability. The potential required to recharge a $CuF_2$ electrode is 3.55V. However, in typical electrolytes for lithium ion batteries, Cu metal oxidizes to $Cu^{2+}$ at approximately 3.4 V vs. $Li/Li^+$. The oxidized copper can migrate to the anode, where it is irreversibly reduced back to Cu metal. As a result, Cu dissolution competes with the recharge of Cu+2LiF to $CuF_2$, preventing cycling of the cell. The Cu metal accumulating on the anode surface can increase the impedance and/or destroy the solid-electrolyte interphase (SEI) on the anode.

The following papers and patents are among the published literature on metal fluorides that employ mixed conductors that are not electrochemically active within the voltage window of the metal fluoride: Badway, F. et al., *Chem. Mater.*, 2007, 19, 4129; Badway, F. et al., *J. Electrochem. Soc*, 2007, 150, A1318; "Bismuth fluoride based nanocomposites as electrode materials" U.S. Pat. No. 7,947,392; "Metal Fluoride And Phosphate Nanocomposites As Electrode Materials" US 2008/0199772; "Copper fluoride based nanocomposites as electrode materials" US 2006/0019163; and "Bismuth oxyfluoride based nanocomposites as electrode materials" U.S. Pat. No. 8,039,149.

In some prior batteries, conductive coatings have been applied to electrode materials. In secondary battery applications, some electrodes have been formed from carbon-coated $LiFePO_4$. Also, some research has occurred on coating carbon-fluoride compounds used for electrodes in primary batteries (see Q. Zhang, et al., Journal of Power Sources 195 (2010) 2914-2917). Prior art coatings are typically applied at high temperatures and under inert atmosphere which can degrade cathode active materials. Thus, temperature-sensitive active materials for cathodes have not typically been coated with conductive carbon materials.

Certain embodiments of the present invention address the challenges found in batteries. Certain embodiments of the present invention can be used to form electrochemical cells for batteries that exhibit lower underpotential, higher power, higher capacity at a high discharge rate, less heat generation, or faster heat dissipation when compared to prior batteries.

Certain embodiments of the present invention can be used to form electrochemical cells having metal fluoride active material that exhibit improved rate performance, improved energy efficiency, and improved cycle life when compared to prior batteries.

These and other challenges can be addressed by embodiments of the present invention described below.

BRIEF SUMMARY OF THE INVENTION

Certain embodiments of the invention include an electrode for an electrochemical cell including an active electrode material, a binder material, and an intrinsically conductive coating wherein the coating is applied to the active electrode material. In certain embodiments, the intrinsically conductive coating is formed from an organic coating compound comprising a conjugated core. In certain embodiments, the intrinsically conductive coating is formed from an organic coating compound comprising a conjugated core in which at least 90% of the carbon atoms are sp or sp2 hybridized. In certain embodiments, the intrinsically conductive coating is formed from an organic coating compound in which at least 35% of the carbon atoms are sp or sp2 hybridized.

Certain embodiments of the invention include a method of making an electrode for an electrochemical cell including combining a coating compound characterized by having an intrinsic conductivity and an active electrode material to form a mixture, heating the mixture to form a conductively coated active electrode material, wherein the mixture is heated for a time and at a temperature that limits degradation of the active electrode material, mixing the conductively coated active electrode material with a binder material and a conductive additive to form an electrode-forming mixture, and heating the electrode-forming mixture to form the electrode. In certain embodiments, the coating compound is heated at less than about 450 degrees C. In certain embodiments, the coating compound is heated for a time in a range of from about 0 hours to about 6 hours.

Certain embodiments of the invention include a method of making a composition for use in forming a cathode for a battery. The method includes milling a metal fluoride material with a metal complex and annealing the mixture, wherein at least a portion of the metal fluoride material and at least a portion of the metal complex undergo a phase change. The method can include forming a coating on at least a portion of the metal fluoride material. The metal fluoride material is preferably $CuF_2$. The metal complex can be a metal oxide including, but not limited to, $Al_2O_3$, $SiO_2$, $MoO_3$, $MoO_2$, NiO, CuO, $VO_2$, $V_2O_5$, $TiO_2$. Preferably, the metal oxide is NiO. The annealing temperature is less than 450 degrees C., less than 400 degrees C., less than 325 degrees C., or less than 200 degrees C. Preferably, the annealing temperature is about 325 degrees C. The temperature is chosen such that it is sufficiently high for the metal complex to react with the metal fluoride, but not high enough to decompose the metal fluoride. Without such heat treatment and the resulting reaction, the material is not rechargeable, as is demonstrated by experiments described herein.

Certain embodiments of the invention include a composition formed by the methods disclosed herein. The composition is characterized by having reversible capacity. The composition can include particles with a grain size greater than 100 nm, 110 nm, 120 nm, or 130 nm. The composition can include a particle having a first phase and a coating on the particle having a second phase. Preferably, the first phase includes the metal fluoride and the second phase includes the metal oxide. The coating can be bonded to the particle, such as by covalent bonding.

Certain embodiments include the method of making an electrochemical cell containing coated cathode materials and methods of use of such electrochemical cells.

DETAILED DESCRIPTION OF THE INVENTION

Figure 1:
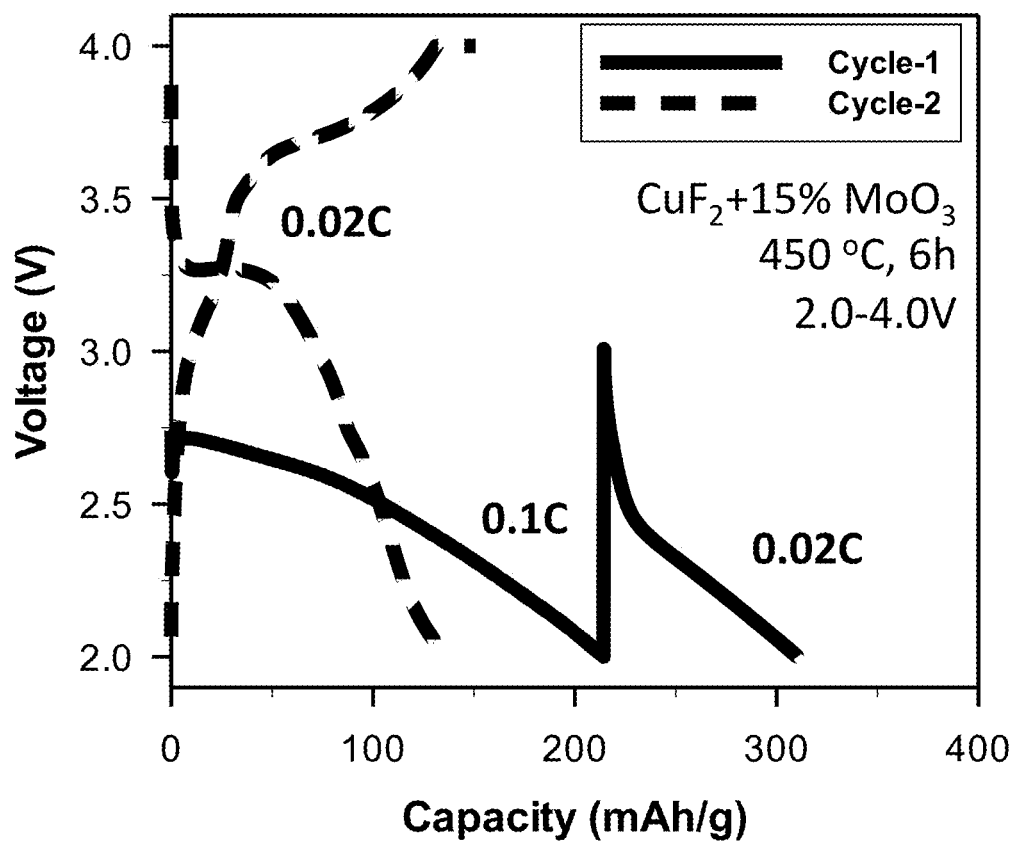
FIG. 1 illustrates electrochemical characterization of a hybrid cathode formed from a metal fluoride and a reactant material according to certain embodiments. The cathode demonstrates rechargeability.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The terms "coating," "coat," "coated," and the like refer to a relatively thin film of material on the surface of a substrate and the process of making the same. The terms include films that are continuous and films that are discontinuous.

The terms "conductive," "conductor," "conductivity," and the like refer to the intrinsic ability of a material to facilitate electron or ion transport and the process of doing the same. The terms include materials whose ability to conduct electricity may be less than typically suitable for conventional electronics applications but still greater than an electrically-insulating material.

The term "core" and the like refers to the central moiety of a molecule as opposed to pendant groups on the molecule. The core may occupy the entire molecule. The shape of the molecule is not determinative of the presence or lack of a core.

The term "solvent" and the like refers to a materials capable of at least partially dissolving another material. The term includes a single solvent or a mixture containing one or more solvents, and such mixture can include non-solvents.

The term "slurry" and the like refers to a mixture in which at least some amount of one or more components is not dissolved in the solvent, and includes mixtures of two materials where the mixture is formed without a solvent or the mixture that results when the solvent is substantially removed but before the final product or article to be made from the mixture has been formed.

The term "active material" and the like refers to the material in an electrode, particularly in a cathode, that donates, liberates, or otherwise supplies the conductive species during an electrochemical reaction in an electrochemical cell.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to any of the chemical elements in group 17 of the periodic table, including fluorine (F), chlorine (Cl), bromine (Br), iodine (I), and astatine (At).

The term "chalcogen" refers to any of chemical elements in group 16 of the periodic table, including oxygen (O), sulfur (S), selenium (Se), tellurium (Te), and polonium (Po).

The term "alkali metal" refers to any of the chemical elements in group 1 of the periodic table, including lithium (Li), sodium (Na), potassium (K), rubidium (Rb), cesium (Cs), and francium (Fr).

The term "alkaline earth metals" refers to any of the chemical elements in group 2 of the periodic table, including beryllium (Be), magnesium (Mg), calcium (Ca), strontium (Sr), barium (Ba), and radium (Ra).

The term "rare earth element" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

In certain embodiments, a novel active material, which may be referred to as a matrix material or a coated material or a hybrid material, is prepared for use in a cathode with metal fluoride (MeF$_x$) active materials. In some embodiments, the novel active material is prepared by combining a metal fluoride and a metal complex, followed by heat treatment of the mixture under an inert atmosphere according to the formula (I)

$$MeF_x + Me'_y X_z + heat \quad\quad\quad (I)$$

According to certain embodiments, the heat treatment of the metal fluoride and metal complex causes a reaction to form a new phase according to the formula (II)

$$MeF_x + Me'_y X_z \rightarrow Me_a Me'_b X_c F_d \quad\quad\quad (II)$$

where x, y, z, a, b, and c depend on the identity and valence of the Me, Me', and X. In other embodiments, the heat treatment causes the formation of covalent bonds between the metal fluoride and the metal complex, improving conductivity and passivating the surface. The heat treatment drives the reaction of in formula (II) and is required to the form the desired reaction product.

Suitable metal complexes, which can act as precursors for the reaction described herein, for use in synthesizing the matrix, coating, or active material include, but are not limited to, $MoO_3$, $MoO_2$, NiO, CuO, $VO_2$, $V_2O_5$, $TiO_2$, $Al_2O_3$, $SiO_2$, $LiFePO_4$, $LiMe_T PO_4$ (where Mer is one or more transition metal(s)), metal phosphates, and combinations thereof. According to embodiments of the invention, these oxides can be used in Formula (I).

It is understood that the synthetic route for achieving the matrix, coating, hybrid, or active matrix material may vary, and other such synthetic routes are within the scope of the disclosure. The material can be represented by $Me_a Me'_b X_c F$ and in the examples herein is embodied by a $Cu_3 Mo_2 O_9$ matrix. Other matrices and coatings are within the scope of this disclosure. For example, $NiCuO_2$, $Ni_2 CuO_3$, and $Cu_3 TiO_4$.

The matrix and coating materials disclosed herein provide rechargeability to otherwise non-rechargeable metal fluoride matrix materials. Without being bound by a particular theory or mechanism of action, the rechargeability may be due to the electrochemical properties of the novel matrix, the coating of the metal fluoride to prevent copper dissolution, or a more intimate interface between the metal fluoride and the matrix material as a result of the heat treatment and reaction. Further, the novel matrix material may provide a kinetic barrier to the Cu dissolution reaction, or to similar dissolution reactions for other metal fluoride materials to the extent such dissolution reactions occur in the cycling of electrochemical cells.

In the case of oxide-based matrices (such matrices include those generated according to Formula II), intimate mixing of the metal fluoride and the metal complex (or other suitable precursor material) and moderate heat treatment can be used to generate rechargeable electrode materials. Other suitable precursors include materials that decompose to form metal oxides (and in particular, transition metal oxides) as opposed to using a metal oxide to directly react with the metal fluoride. Examples of such precursors include, but are not limited to, metal acetates, metal acetylacetonates, metal hydroxides, metal ethoxides, and other similar organo-metallic complexes. In either event, the final rechargeable matrix material is not necessarily a pure oxide or a purely crystalline material. The reaction of Formula II predicts that there would not be a pure oxide or a purely crystalline material. In some instances, the metal oxide precursor or metal oxide material can form a coating, or at least a partial coating, on the metal fluoride active material. Without being bound by a particular theory or mechanism of action, the reaction of the metal oxide precursor or metal oxide material with the surface of the metal fluoride (and in particular copper fluoride) active material is important for generating a rechargeable electrode active material.

Certain embodiments of the invention relate to compounds useful for the formation of conductive coatings on such novel active materials. Preferably, the compounds of embodiments of the invention are used to coat active materials that degrade, decompose, or are otherwise rendered unsuitable or undesirable for use after exposure to high temperatures or high temperature under an inert atmosphere, where high temperatures are those higher than about 500 degrees C. The compounds are capable of forming conductive coatings at temperatures less than about 500 degrees C. on such active materials.

In certain embodiments, conductive coatings are used to improve the electrical conductivity of desirable active materials, including metal-fluoride and carbon-fluoride active materials. In certain embodiments, conductive coatings are used to improve the electrical conductivity of iron-fluoride compounds (such as $FeF_3$), manganese-fluoride compounds (such as $MnF_3$), copper-fluoride compounds (such as $CuF_2$), and carbon-fluoride compounds. In certain embodiments, conductive coatings are used to improve the electrical conductivity of lithium-manganese-nickel-oxygen (LMNO) compounds, lithium-manganese-oxygen (LMO) compounds, and lithium-rich layered oxide compounds. More generally, conductive coatings are used to improve active materials for cathodes including phosphates, fluorophosphates, fluorosulphates, silicates, spinels, and composite layered oxides. In particular, conductive coatings are formed on the novel active materials of Formula (I) and/or Formula (II).

According to certain embodiments, active materials are coated using a precursor material. Suitable precursor materials facilitate the deposition of a conductive coating onto the active material, and in particular onto particles of the active material.

According to certain embodiments, the compounds useful for the formation of conductive carbon coatings on active materials are organic molecules with delocalized electron configurations. According to certain embodiments, the compounds are conductive organic molecules. It is understood that any compound with a high degree of electron delocalization or any compound with high conductivity could be used to form conductive coatings on active materials.

Generally speaking, delocalized electrons are electrons that are not limited to the orbital of a single atom, in the case of ions or metals, or a single covalent bond, in the case of organic materials. In carbon-based materials, bonds including a carbon atom can be a source for delocalized electrons when more than one of the four electrons in the outer energy levels of the carbon atom is in a covalent bond with another atom. Often, electron delocalization occurs in carbon-carbon bonds. These bonds are sometimes referred to as conjugated bonds.

According to hybridization theory, delocalized electrons can be described as mixing among valence orbitals of an atom such as carbon. In carbon, hybridized orbitals can be $sp^3$ hybrids, $sp^2$ hybrids, and sp hybrids. Without being bound by theory or a particular mode of action, it is believed that organic materials with a high degree of sp or $sp^2$ hybridization are preferable for forming conductive carbon coatings on active materials. Compounds, according to embodiments of the invention, contain conjugated cores in which many of the carbon atoms are sp or $sp^2$ hybridized. Compounds, according to embodiments of the invention, may be known for their intrinsic conductivity.

Conductive carbon coatings of the prior art, such as graphitic coatings, are formed from non-conductive carbon molecules with non-hybridized or $sp^3$ hybridized orbital electrons. Such materials are typically heated to high temperatures to decompose and graphitize them, often forming carbon coatings with $sp^2$ hybridized orbitals. In such coatings, it is known that the efficiency of the graphitization increases with temperature and that high temperature heat treatment gives the best performing coatings.

In contrast, compounds of certain embodiments do not require high temperature heat treatment due at least in part to their intrinsic conductivity. Compounds of the embodiments of the present invention do not require graphitization to provide a conductive carbon coating. Further, decomposition of compounds of embodiments of the invention may be undesirable as it would likely reduce or destroy the intrinsic conductivity of the compounds.

According to embodiments of the invention, compounds for coating active materials contain carbon atoms that are sp or $sp^2$ hybridized. Preferably, at least 35% of the carbon atoms in the compound are sp or $sp^2$ hybridized. Preferably, at least 40% of the carbon atoms in the compound are sp or $sp^2$ hybridized. Preferably, at least 45% of the carbon atoms in the compound are sp or $sp^2$ hybridized. Preferably, at least 50% of the carbon atoms in the compound are sp or $sp^2$ hybridized. Preferably, at least 55% of the carbon atoms in the compound are sp or $sp^2$ hybridized. Preferably, at least 60% of the carbon atoms in the compound are sp or $sp^2$ hybridized. Preferably, at least 65% of the carbon atoms in the compound are sp or $sp^2$ hybridized. Preferably, at least 70% of the carbon atoms in the compound are sp or $sp^2$ hybridized. Preferably, at least 75% of the carbon atoms in the compound are sp or $sp^2$ hybridized. Preferably, at least 80% of the carbon atoms in the compound are sp or $sp^2$ hybridized. Preferably, at least 85% of the carbon atoms in the compound are sp or $sp^2$ hybridized. Preferably, at least 90% of the carbon atoms in the compound are sp or $sp^2$ hybridized. Preferably, at least 95% of the carbon atoms in the compound are sp or $sp^2$ hybridized. Preferably, 100% of the carbon atoms in the compound are sp or $sp^2$ hybridized.

According to embodiments of the invention, compounds for coating active materials contain conjugated cores in which many of the carbon atoms are sp or $sp^2$ hybridized. Preferably, the compounds contain conjugated cores in which at least 35% of the carbon atoms are sp or $sp^2$ hybridized. Preferably, the compounds contain conjugated cores in which at least 40% of the carbon atoms are sp or $sp^2$ hybridized. Preferably, the compounds contain conjugated cores in which at least 45% of the carbon atoms are sp or $sp^2$ hybridized. Preferably, the compounds contain conjugated cores in which at least 50% of the carbon atoms are sp or $sp^2$ hybridized. Preferably, the compounds contain conjugated cores in which at least 55% of the carbon atoms are sp or $sp^2$ hybridized. Preferably, the compounds contain conjugated cores in which at least 60% of the carbon atoms are sp or $sp^2$ hybridized. Preferably, the compounds contain conjugated cores in which at least 65% of the carbon atoms are sp or $sp^2$ hybridized. Preferably, the compounds contain conjugated cores in which at least 70% of the carbon atoms are sp or $sp^2$ hybridized. Preferably, the compounds contain conjugated cores in which at least 75% of the carbon atoms are sp or $sp^2$ hybridized. Preferably, the compounds contain conjugated cores in which at least 80% of the carbon atoms are sp or $sp^2$ hybridized. Preferably, the compounds contain conjugated cores in which at least 85% of the carbon atoms are sp or $sp^2$ hybridized. Preferably, the compounds contain conjugated cores in which at least 90% of the carbon atoms are sp or $sp^2$ hybridized. Preferably, the compounds contain conjugated cores in which at least 95% of the carbon atoms are sp or $sp^2$ hybridized. Preferably, the compounds contain conjugated cores in 100% of the carbon atoms are sp or $sp^2$ hybridized.

Examples of compounds containing conjugated cores include but are not limited to: pentacene, anthracene, naphthalene, rubrene, C60, graphene, multi-walled carbon nanotubes (MWCNT), N,N'-dioctyl-3,4,9,10 perylenedicarboximide, perylene, pyrene, tetrathiafulvalene, polyaniline, 6,13-bis(triisopropylsilylethynyl)pentacene, 4-(heptadecafluorooctyl) aniline, poly(3-hexylthiophene-2,5-diyl), 7,7,8,8-tetracyanoquinodimethane, 11-phenoxylundecanoic acid, triphenylene, poly(2,6-naphthalenevinylene), octofluoronapthalene, oligothiophenes, hexabenzocoronene, phthalocyanine, p-quinquephenyl 8, tetra-N-phenylbenzidine, octafluoronaphthalene and N,N'-dioctyl-3,4,9,10-perylenedicarboximide. More than one compound can be combined in a single coating to generate additive or enhanced performance.

Examples of carbon source coating materials according to certain embodiments of the invention include but are not limited to: tris[4-(5-dicyanomethylidenemethyl-2-thienyl)phenyl]amine, triphenylene, tetrathiafulvalene, rubrene, pyrene, polyaniline (emeraldine base), poly(3-hexylthiophene-2,5-diyl), PNV, perylene-3,4,9,10-tetracarboxylic dianhydride, perylene, pentacene/MWCNT, pentacene/anthracene (4:1), pentacene/anthracene (1:4), pentacene-N-sulfinyl-tert-butylcarbamate, pentacene, naphthalene, N,N'-dioctyl-3,4,9,10-perylenedicarboximide, dithieno[3,2-b:2?,3?-d]thiophene, dilithium phthalocyanine, dibenzotetrathiafulvalene, dibenz[a,h]anthracene, coronene, copper(II) phthalocyanine, C60, bis(ethylenedithio)tetrathiafulvalene, benz[b]anthracene, anthracene, 29H,31H-phthalocyanine, 11-phenoxyundecanoic acid, 7,7,8,8-tetracyanoquinodimethane, 6,13-bis(triisopropylsilylethynyl) pentacene, 5,10,15,20-tetrakis(pentafluorophenyl) porphyrin, 4-(heptadecafluorooctyl)aniline, 2,2':5',2":5",2'''-quaterthiophene, 1,8-naphthalic anhydride, 1,6-diphenyl-1,3,5-hexatriene, 1,4,5,8-naphthalenetetracarboxylic dianhydridem, 1,3-dimethyl-2-phenyl-2,3-dihydro-1H-benzoimidazole, and combinations thereof.

According to certain embodiments, electrodes for use in electrochemical cells are formed from an active material, a binder material, and a conductive material. The active material is typically in particulate form, but it may take other forms. Prior to forming the electrode, active materials are coated using compounds according to embodiments of the invention. In certain embodiments, the compound "wets" the particles of the active material. The compound can wet the particles due to being in solution or due to melting. According to certain embodiments, preferred compounds for coating active material particles would both wet the particles and form a conductive coating at a temperature below about 500 degrees C. According to certain embodiments, preferred carbon precursors for coating carbon-fluoride or metal-fluoride particles would both wet the particles and form a conductive coating at a temperature below about 600 degrees C. to about 700 degrees C. Preferably, the compounds produce a substantially conductive carbon coating at temperatures below the range of decomposition temperatures for the active materials.

According to certain embodiments of the invention, the compound is mixed with a solvent. In these embodiments, solvents are paired with compounds based on solubility, wettability, viscosity, flashpoint, volatility, and other properties. The compound and the solvent are mixed using any means of mixing, including ball milling. In certain embodiments, active material and compound are ball-milled with acetone as a solvent. Examples of appropriate solvents include acetone, NMP, methanol, hexane, acetonitrile, THF, DMSO, pyridine, benzene, water, ethanol, isopropanol, and combinations thereof. In certain embodiments, the solvent improves the wetting of the compound onto active material particles to produce a more uniform and complete coating prior to the heating step. In other embodiments, the solvent aids the processing of compound particles and active material particles to improve mixing and/or control particle size prior to the heating step. Such improvements in the uniformity and completeness of the coating prior to heating provide more uniform and complete molecular coatings on the active material after heating.

According to certain embodiments, the active material, compound, and solvent are mixed using a method such as ball milling. Preferably, the active material, coating compound, and solvent are mixed using a method that produces a substantially uniform and complete coating of the coating compound on the active material. In some embodiments, the active material, compound, and solvent are agitated to produce a substantially uniform and complete coating of the compound on the active material. In some embodiments, the active material and the coating compound are mixed without a solvent.

According to certain embodiments, the mixture of the active material, compound, and solvent forms a slurry. In certain embodiments, the slurry is heated to produce a conductive carbon coating on the active material. In certain embodiments, it is preferable for the heating to occur under inert atmosphere.

According to certain embodiments, the heating conditions are chosen to produce a thin layer of conducting carbon on the active material while limiting degradation of the active electrode material. In some embodiments, the heating occurs at a range of temperatures from about 300 degrees C. to about 700 degrees C., or preferably from about 400 degrees C. to about 600 degrees C. In some embodiments, the heating occurs at less than about 500 degrees C. Preferably, the heating occurs at less than about 450 degrees C. Preferably, the heating occurs at less than about 400 degrees C. Preferably, the heating occurs at less than about 350 degrees C. Preferably, the heating occurs at less than about 300 degrees C. Preferably, the heating occurs at less than about 250 degrees C. Preferably, the heating occurs at less than about 200 degrees C. Preferably, the heating occurs at less than about 150 degrees C. Preferably, the heating occurs at less than about 100 degrees C.

In certain embodiments, it is preferable to tailor the annealing such that the sp or $sp^2$ hybridized atoms are not decomposed and that the delocalized electrons of the conjugated cores are substantially maintained. However, it is also preferable to provide the system with sufficient energy (e.g., thermal and/or mechanical energy) to yield desirable coverage on the particles of active material. In certain embodiments, lower annealing temperatures increase battery capacity but reduce voltage performance. In certain embodiments, a reaction occurs between the coating precursor and the active materials such that the system undergoes a color change, which may be evidence of covalent bonding between the coating compounds and the active materials.

In some embodiments, the heating occurs for less than about 6 hours. Preferably, the heating occurs for less than about 5 hours. Preferably, the heating occurs for less than about 4 hours. Preferably, the heating occurs for less than about 3 hours. Preferably, the heating occurs for less than about 2 hours. Preferably, the heating occurs for less than about 1 hour.

According to certain embodiments, the coated active materials are further mixed with a binder material and a conductive material. In such embodiments the mixing can be done by suitable methods, such as ball milling, to form an electrode-forming material. The electrode-forming material is typically composed primarily of coated active material, preferably in the range of from about 85% to about 97% of active material. The remainder of the electrode-forming material is composed of the binder material and the conductive material. The binder material is typically present at about 2.5% to about 11%. In certain embodiments, the conductive material is present in a range of from about 0.5% to about 7.5%.

According to certain embodiments, metal fluoride active materials are coated using the methods disclosed herein. Coated metal fluoride active materials may be prepared with or without solvents. Certain embodiments exemplified herein were prepared without solvents. Further, coated metal fluoride active materials may be combined into mixture or composites with ionic conductors to improve ionic conduction. For example, $MoO_3$ may be used to improve ionic conduction with coated $CuF_2$ active materials. Further, the metal fluoride active materials may be formed into cathode materials using conductive matrix materials as disclosed herein. Alternately, the conductive matrix may be formed by combining $CuF_2$ and a matrix material and then applying the conductive coating. Indeed, the components may be combined and applied in any order. These metal fluorides composites may also benefit from the use of an adjunct ionic conductor.

For example, the matrix material $LiFePO_4$ combined with a coated $CuF_2$ active material demonstrates significant improvement in rate performance and also demonstrates a low voltage drop when comparing low discharge rates and high discharge rates. These performance benefits are not limited to $CuF_2$ and are applicable to other metal fluorides as well.

Unexpectedly, as compared to our work with carbon fluoride active materials, certain coating precursors did not perform well with conductive matrix materials for use with metal fluoride materials. For example, certain conductive matrix materials for use with metal fluoride active materials coated with dilithium phthalocyanine, perylene, or PVDF displayed inferior performance as compared to uncoated conductive matrix materials for use with metal fluoride active materials.

As described in the examples below, certain embodiments produce coated electrodes that deliver higher power, increased operating voltage, higher capacity at a high discharge rate, and reduced heat buildup when compared with uncoated electrodes. Without being bound by a particular principle, hypothesis, or method of action, coatings of certain embodiments of the invention provide a low resistance pathway for electron and lithium ion transport, which significantly lowers the electrode resistance. One consequence of this is an electrochemical cell with higher power and lower underpotential. As a result, higher capacity can be obtained when electrochemical cells are run at comparatively high rate.

As illustrated in certain examples herein, the coatings of certain embodiments of the invention address some of the challenges of batteries by enabling higher power, increasing operating voltage, increasing capacity at a high discharge rate, reducing heat generation, and increasing heat dissipation. For example, in high-drain applications certain embodiments improve the energy capacity of batteries such that a higher voltage may be achieved at a high current when compared to prior batteries. Certain embodiments extend the useful life of batteries under moderate to high drain conditions. Unexpectedly, the coatings of certain embodiments of the present invention address these challenges at low concentrations. Coated cathode materials according to certain embodiments of the invention demonstrated improved voltage and power at late depths of discharge.

Coated cathode materials according to certain embodiments of the invention were included in electrochemical cells according to the examples set forth below. In some situations, the electrolyte solution in the electrochemical cell included additives according to using materials and methods disclosed in copending U.S. patent application Ser. No. 13/612,798 filed Sep. 12, 2012 and titled "Electrolyte Materials for Batteries and Methods of Use," which application is incorporated by reference herein in its entirety. The combination of the coated cathode materials of certain embodiments of the invention and such electrolyte solutions including additives demonstrated improved performance. In many cases, the performance improvements were substantially greater than the performance improvements realized by either the coating or the additive on its own.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Example 1

Fabrication of Matrix and/or Coated Electrodes for Rechargeable Cells

Materials and Synthetic Methods.

All reactions were prepared in a high purity argon filled glove box (M-Braun, $O_2$ and humidity contents <0.1 ppm). Unless otherwise specified, materials were obtained from commercial sources (e.g., Sigma-Aldrich, Advanced Research Chemicals Inc., Alfa Aesar, Strem) without further purification.

Preparation of $CuF_2$/Matrix.

Milling vessels were loaded with $CuF_2$ at from about 85 wt % to about 95 wt % and reactant (metal oxide or metal oxide precursor) at from about 5 wt % to about 15 wt %, and the vessels were sealed. The mixture was milled. After milling, samples were annealed at from about 200 degrees C. to about 575 degrees C. for 1 to 12 hours under flowing N2. Specific matrix reactants were processed as described below.

Preparation of $CuF_2/CusMo_2O_9$.

Milling vessels were loaded with $CuF_2$ (85 wt %) and $MoO_3$ (15 wt %), sealed, and then milled. After milling, samples were annealed at 450 degrees C. for 6 hours under flowing N2.

Preparation of $CuF_2$/NiO.

Milling vessels were loaded with $CuF_2$ (85 wt %) and NiO (15 wt %), sealed, and then milled. After milling, samples were annealed at 325 degrees C. for 6 hours under flowing N2.

Preparation of $CuF_2$/Nickel(II) Acetylacetonate.

A fine dispersion of $CuF_2$ was prepared by milling in the presence of THF (40-120 mg $CuF_2$/mL THF). The dispersed sample was then added to a solution of Ni(AcAc)2 in THF such that Nickel(II) acetylacetonate accounted for 15 wt % of the solids in the solution. The solution was then agitated by either shaking, sonication, or low energy milling for from about 1 to about 12 hours. The solution was then dried at room temperature under vacuum and the resulting solid was annealed at 450 degrees C. for 6 hours under dry air.

Electrode Formulation.

In some embodiments, cathodes were prepared using a formulation composition of 80:15:5 (active material:binder:conductive additive) according to the following formulation method: 133 mg PVDF (Sigma Aldrich) and about 44 mg Super P Li (Timcal) was dissolved in 10 mL NMP (Sigma Aldrich) overnight. 70 mg of coated composite powder was added to 1 mL of this solution and stirred overnight. In other embodiments, cathodes were prepared using a formulation composition of 85:7.5:7.5 (active material:binder:conductive additive) according to the following formulation method: 133 mg PVDF (Sigma Aldrich) and about 133 mg Super P Li (Timcal) was dissolved in 15 mL NMP (Sigma Aldrich) overnight. 150 mg of coated composite powder was added to 1 mL of this solution and stirred overnight. Films were cast by dropping about 70 μL of slurry onto stainless steel current collectors and drying at 150 degrees C. for about 1 hour. Dried films were allowed to cool, and were then pressed at 1 ton/cm². Electrodes were further dried at 150 degrees C. under vacuum for 12 hours before being brought into a glove box for battery assembly.

Example 2

Electrochemical Characterization of Electrochemical Cells Containing Rechargeable Electrodes All batteries were assembled in a high purity argon filled glove box (M-Braun, $O_2$ and humidity contents <0.1 ppm), unless otherwise specified. Cells were made using lithium as an anode, Celgard 2400 separator, and 90 μL of 1M LiPF6 in 1:2 EC:EMC electrolyte. Electrodes and cells were electrochemically characterized at 30 degrees C. with a constant current C/50 charge and discharge rate for the first 2 cycles and C/5 charge and discharge rate for the following cycles between 4.0 V and 2.0 V. A 3 hour constant voltage step was used at the end of each charge. In some instances, cathodes were lithiated pressing lithium foil to the electrode in the presence of electrolyte (1M LiPF6 in 1:2 EC:EMC) for about 15 minutes. The electrode was then rinsed with EMC and built into cells as described above, except graphite was used as the anode rather than lithium.

Example 3

Fabrication of Conductively Coated Metal Fluoride Electrodes

Materials and Synthetic Methods.

All reactions were prepared in a high purity argon filled glove box (M-Braun, $O_2$ and humidity contents <0.1 ppm).

Unless otherwise specified, materials were obtained from commercial sources (Sigma-Aldrich, Advanced Research Chemicals Inc, Alfa Aesar, Strem, etc) without further purification.

Preparation of Conductively Coated $CuF_2$/NiO.

Milling vessels were loaded with $CuF_2$, NiO, and conductive coating precursor at the desired ratios, sealed, and then milled for about 20 hours. The milling vessels were opened under argon gas and the conductive coating precursor materials were added. The milling vessels were sealed and milled at low energy. After milling, the powder samples were annealed (for example, at 325 degrees C. for 6 hours).

Electrode Formulation.

In some embodiments, cathodes were prepared using a formulation composition of 80:15:5 (active material:binder:conductive additive) according to the following formulation method: 133 mg PVDF (Sigma Aldrich) and about 44 mg Super P Li (Timcal) was dissolved in 10 mL NMP (Sigma Aldrich) overnight. 70 mg of coated composite powder was added to 1 mL of this solution and stirred overnight. In other embodiments, cathodes were prepared using a formulation composition of 85:7.5:7.5 (active material:binder:conductive additive) according to the following formulation method: 133 mg PVDF (Sigma Aldrich) and about 133 mg Super P Li (Timcal) was dissolved in 15 mL NMP (Sigma Aldrich) overnight. 150 mg of coated composite powder was added to 1 mL of this solution and stirred overnight. Films were cast by dropping about 70 μL of slurry onto stainless steel current collectors and drying at 150 degrees C. for about 1 hour. Dried films were allowed to cool, and were then pressed at 1 ton/cm$^2$. Electrodes were further dried at 150 degrees C. under vacuum for 12 hours before being brought into a glove box for battery assembly.

Example 4

Electrochemical Characterization of Conductively Coated Metal Fluoride Electrodes All batteries were assembled in a high purity argon filled glove box (M-Braun, $O_2$ and humidity contents <0.1 ppm), unless otherwise specified. Cells were made using lithium as an anode, Celgard 2400 separator, and 90 μL of 1M $LiPF_6$ in 1:2 EC: EMC electrolyte. Electrodes and cells were electrochemically characterized at 30 degrees C. using the following protocol: constant current discharge at 1 C, 0.5 C, 0.2 C, 0.1 C, 0.05 C, and 0.02 C rate to 2.0 V cutoff.

FIG. 1 illustrates the results of electrochemical characterization of certain embodiments disclosed herein. Specifically, the first and second cycle voltage traces for a cell containing a cathode formed from a metal fluoride and the new matrix material. In this case, the metal fluoride active material is $CuF_2$ and the matrix material is $Cu_3Mo_2O_9$. FIG. 1 demonstrates that the cell has about 140 mAh/g of reversible capacity. Previously known cathodes containing $CuF_2$ have not demonstrated such significant reversible capacity.

Figure 2:
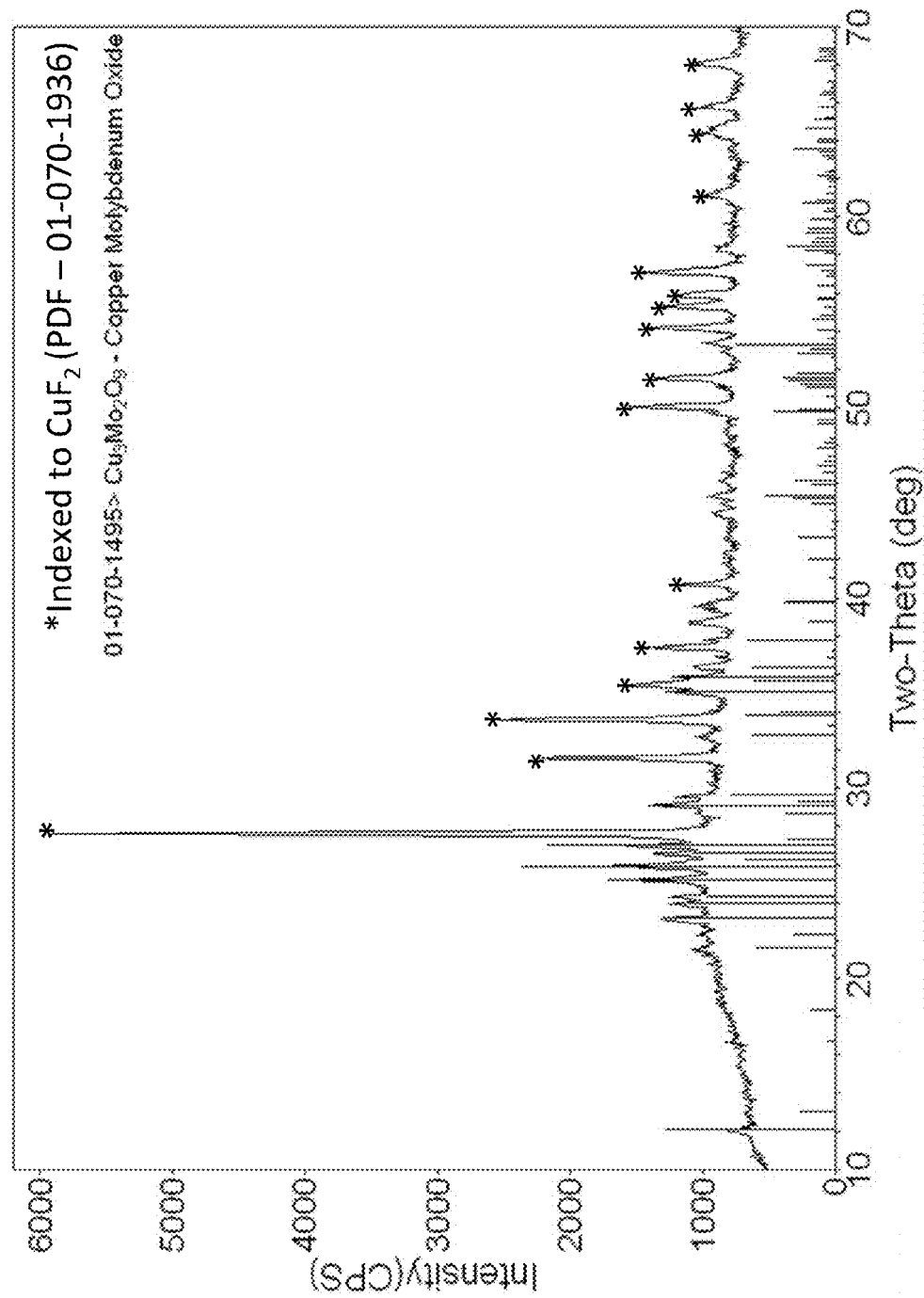
FIG. 2 illustrates a powder X-ray diffraction pattern of a material used to for a rechargeable metal fluoride cathode.

FIG. 2 illustrates the results of structural characterization of certain embodiments disclosed herein. Specifically, the powder X-ray diffraction pattern of the material forming the cathode tested in FIG. 1 is shown along with the powder X-ray diffraction patterns of $CuF_2$ and $Cu_3Mo_2O_9$. FIG. 2 demonstrates that the material contains phases rich in $CuF_2$ and phases rich in $Cu_3Mo_2O_9$. Thus, FIG. 2 demonstrates a new matrix material in combination with a metal fluoride active material. Further, grain size analysis of this powder X-ray diffraction data shows that the $CuF_2$ has a grain size greater than 130 nm. This is a significant finding since such comparatively large particles were thought to be too large to provide good electrochemical performance.

For many of the rechargeable matrices described herein (and in particular for matrices including Mo, Ni, or Ti), the reactions described herein yield a new matrix material at least at the surface of the particles of the metal fluoride active material. The novel material present at least at the surface of the particles of the metal fluoride active material is believed to provide many of the benefits disclosed herein.

Figure 3:
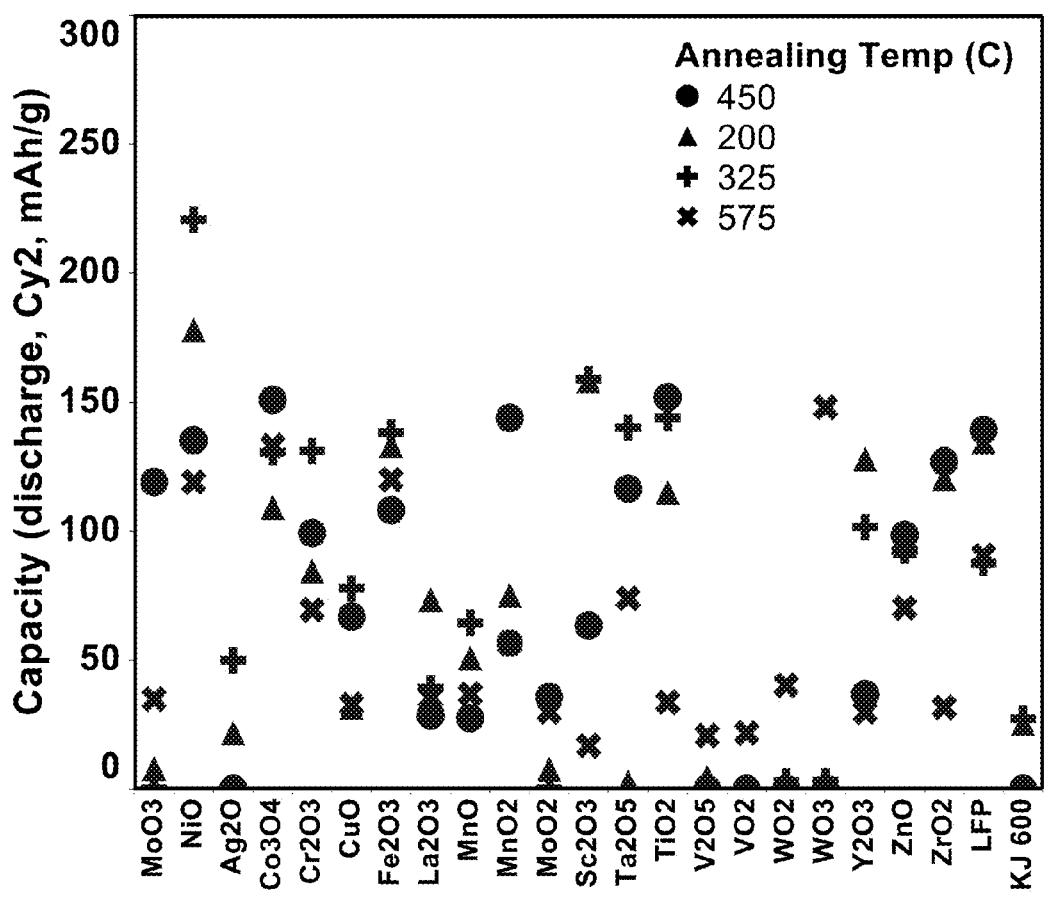
FIG. 3 illustrates second cycle discharge capacity for a variety of hybrid cathode materials used according to embodiments of the invention.

FIG. 3 illustrates the results of electrochemical characterization of certain embodiments disclosed herein. Specifically, the second cycle discharge capacity of $CuF_2$ with various matrices and annealing temperatures. FIG. 3 shows many oxide matrices that provide recharge capability, demonstrated by capacities greater than 100 mAh/g.

Table 1 presents the results of further electrochemical characterization of certain embodiments disclosed herein. Table 1 shows that many metal oxide and metal oxide precursor starting materials can be used in the reactions described herein to yield rechargeable metal fluoride electrode materials. The materials in Table 1 include metal oxides, metal phosphates, metal fluorides, and precursors expected to decompose to oxides. In particular, nickel oxide showed excellent performance.

TABLE 1

Electrochemical Characterization of Various Precursor Materials as a Function of Anneal Temperature

| Matrix/Coating Precursor | Annealing Temp (C.) | Initial Capacity (0.02 C, Cy1, mAh/g) | Reversible Capacity (0.05 C, Cy2, mAh/g) |
|---|---|---|---|
| (NH4)H2PO4 | 200 | 307 | 5 |
| (NH4)H2PO4 | 325 | 406 | 178 |
| (NH4)H2PO4 | 450 | 397 | 0 |
| Al2O3 | 200 | 281 | 70 |
| Al2O3 | 325 | 348 | 107 |
| Al2O3 | 400 | 203 | 78 |
| AlF3 | 200 | 397 | 124 |
| AlF3 | 325 | 384 | 125 |
| AlF3 | 400 | 320 | 98 |
| AlPO4 | 200 | 410 | 115 |
| AlPO4 | 325 | 356 | 136 |
| AlPO4 | 450 | 284 | 74 |
| Bi2O3 | 200 | 128 | 32 |
| Bi2O3 | 325 | 89 | 34 |
| Bi2O3 | 400 | 103 | 36 |
| CaF2 | 200 | 301 | 86 |
| CaF2 | 325 | 310 | 107 |
| CaF2 | 400 | 282 | 125 |
| CaO | 200 | 1 | 1 |
| CaO | 325 | 138 | 27 |
| CaO | 400 | 84 | 29 |
| Co3(PO4)2 | 200 | 323 | 93 |
| Co3(PO4)2 | 325 | 373 | 161 |
| Co3(PO4)2 | 450 | 382 | 126 |
| Co3O4 | 200 | 167 | 112 |
| Co3O4 | 325 | 216 | 132 |
| Co3O4 | 450 | 329 | 151 |
| Co3O4 | 575 | 310 | 134 |
| Cr2O3 | 200 | 223 | 88 |
| Cr2O3 | 325 | 234 | 132 |
| Cr2O3 | 450 | 227 | 102 |
| Cr2O3 | 575 | 184 | 70 |
| Fe(OAc)2 | 200 | 407 | 31 |
| Fe(OAc)2 | 325 | 431 | 11 |
| Fe(OAc)2 | 450 | 393 | 180 |
| Fe2O3 | 200 | 197 | 135 |
| Fe2O3 | 325 | 200 | 142 |
| Fe2O3 | 450 | 170 | 112 |
| Fe2O3 | 575 | 308 | 131 |
| FeF2 | 200 | 427 | 202 |
| FeF2 | 325 | 382 | 220 |

TABLE 1-continued

Electrochemical Characterization of Various Precursor Materials as a Function of Anneal Temperature

| Matrix/Coating Precursor | Annealing Temp (C.) | Initial Capacity (0.02 C, Cy1, mAh/g) | Reversible Capacity (0.05 C, Cy2, mAh/g) |
|---|---|---|---|
| FeF2 | 400 | 370 | 155 |
| FeF3 | 200 | 443 | 188 |
| FeF3 | 325 | 406 | 218 |
| FeF3 | 400 | 359 | 141 |
| FePO4 | 200 | 252 | 76 |
| FePO4 | 325 | 393 | 147 |
| FePO4 | 450 | 429 | 197 |
| In2O3 | 200 | 250 | 64 |
| In2O3 | 325 | 203 | 106 |
| In2O3 | 400 | 347 | 109 |
| La2O3 | 200 | 281 | 74 |
| La2O3 | 325 | 155 | 39 |
| La2O3 | 450 | 68 | 29 |
| La2O3 | 575 | 114 | 36 |
| Li2O | 200 | 32 | 11 |
| Li2O | 325 | 49 | 18 |
| Li2O | 400 | 38 | 18 |
| Li3PO4 | 200 | 318 | 123 |
| Li3PO4 | 325 | 435 | 136 |
| Li3PO4 | 450 | 409 | 114 |
| LiCoPO4 | 200 | 372 | 97 |
| LiCoPO4 | 325 | 408 | 142 |
| LiCoPO4 | 450 | 338 | 136 |
| LiH2PO4 | 200 | 300 | 111 |
| LiH2PO4 | 325 | 423 | 149 |
| LiH2PO4 | 450 | 387 | 107 |
| LiMnPO4 | 200 | 351 | 77 |
| LiMnPO4 | 325 | 368 | 102 |
| LiMnPO4 | 450 | 397 | 178 |
| LiNiPO4 | 200 | 402 | 116 |
| LiNiPO4 | 325 | 396 | 191 |
| LiNiPO4 | 450 | 405 | 176 |
| MgF2 | 200 | 387 | 135 |
| MgF2 | 325 | 378 | 147 |
| MgF2 | 400 | 360 | 122 |
| MgO | 200 | 313 | 181 |
| MgO | 325 | 259 | 155 |
| MgO | 400 | 198 | 126 |
| MnO | 200 | 117 | 52 |
| MnO | 325 | 130 | 65 |
| MnO | 450 | 83 | 55 |
| MnO | 575 | 59 | 38 |
| MnO2 | 200 | 120 | 76 |
| MnO2 | 325 | 123 | 57 |
| MnO2 | 450 | 242 | 150 |
| MnO2 | 575 | 104 | 69 |
| Mo(OAc)$_2$ | 200 | 396 | 10 |
| Mo(OAc)$_2$ | 325 | 433 | 17 |
| Mo(OAc)$_2$ | 450 | 398 | 46 |
| Na2O | 200 | 2 | 1 |
| Na2O | 325 | 26 | 13 |
| Na2O | 400 | 24 | 13 |
| Ni | 200 | 345 | 197 |
| Ni | 325 | 301 | 178 |
| Ni | 400 | 302 | 158 |
| Ni | 450 | 300 | 152 |
| Ni acac | 200 | 425 | 56 |
| Ni acac | 325 | 306 | 87 |
| Ni Acac | 400 | 247 | 30 |
| Ni acac | 450 | 362 | 172 |
| Ni(OAc)2 | 200 | 397 | 148 |
| Ni(OAc)2 | 325 | 376 | 46 |
| Ni(OAc)2 | 350 | 370 | 191 |
| Ni(OAc)2 | 400 | 383 | 180 |
| Ni(OAc)2 | 450 | 371 | 186 |
| Ni(OAc)2 | 500 | 373 | 171 |
| Ni3(PO4)2 | 200 | 410 | 124 |
| Ni3(PO4)2 | 325 | 430 | 52 |
| Ni3(PO4)2 | 450 | 126 | 44 |
| Ni(C2O2) | 200 | 359 | 90 |
| Ni(C2O2) | 325 | 395 | 195 |
| Ni(C2O2) | 450 | 381 | 175 |
| Ni(CP)2 | 200 | 304 | 27 |
| Ni(CP)2 | 325 | 317 | 14 |
| Ni(CP)2 | 450 | 258 | 148 |
| Ni(OH)2 | 200 | 412 | 186 |
| Ni(OH)2 | 325 | 362 | 196 |
| Ni(OH)2 | 400 | 327 | 181 |
| Ni(OH)2 | 450 | 300 | 169 |
| NiBr2 | 200 | 125 | 0 |
| NiBr2 | 325 | 225 | 78 |
| NiBr2 | 400 | 244 | 113 |
| NiCO3*Ni(OH)2 | 200 | 380 | 17 |
| NiCO3*Ni(OH)2 | 325 | 359 | 215 |
| NiCO3*Ni(OH)2 | 450 | 317 | 184 |
| NiF2 | 200 | 367 | 121 |
| NiF2 | 325 | 395 | 207 |
| NiF2 | 400 | 411 | 170 |
| NiF2 | 450 | 396 | 177 |
| NiO | 125 | 257 | 131 |
| NiO | 200 | 403 | 222 |
| NiO | 225 | 384 | 212 |
| NiO | 250 | 385 | 221 |
| NiO | 275 | 370 | 229 |
| NiO | 300 | 335 | 175 |
| NiO | 325 | 402 | 252 |
| NiO | 350 | 365 | 209 |
| NiO | 375 | 260 | 123 |
| NiO | 400 | 371 | 200 |
| NiO | 425 | 361 | 186 |
| NiO | 450 | 386 | 183 |
| NiO | 500 | 308 | 150 |
| NiO | 575 | 319 | 112 |
| None | 200 | 181 | 30 |
| None | 325 | 394 | 216 |
| None | 450 | 247 | 61 |
| Sb2O3 | 200 | 111 | 34 |
| Sb2O3 | 325 | 147 | 37 |
| Sb2O3 | 400 | 223 | 104 |
| Sc2O3 | 200 | 359 | 159 |
| Sc2O3 | 325 | 293 | 159 |
| Sc2O3 | 400 | 84 | 33 |
| Sc2O3 | 450 | 150 | 68 |
| Sc2O3 | 575 | 55 | 17 |
| ScF3 | 200 | 400 | 178 |
| ScF3 | 325 | 387 | 174 |
| ScF3 | 400 | 243 | 100 |
| SiO2 | 200 | 1 | 1 |
| SiO2 | 325 | 114 | 28 |
| SiO2 | 400 | 230 | 92 |
| SnO2 | 200 | 210 | 48 |
| SnO2 | 325 | 182 | 68 |
| SnO2 | 400 | 133 | 65 |
| SrO | 200 | 152 | 12 |
| SrO | 325 | 66 | 16 |
| SrO | 400 | 134 | 48 |
| Ta2O5 | 200 | 289 | 4 |
| Ta2O5 | 325 | 269 | 141 |
| Ta2O5 | 450 | 298 | 121 |
| Ta2O5 | 575 | 317 | 74 |
| Ti(OEt)4 | 200 | 438 | 21 |
| Ti(OEt)4 | 325 | 453 | 12 |
| Ti(OEt)4 | 450 | 353 | 5 |
| TiO2 | 225 | 322 | 150 |
| TiO2 | 250 | 309 | 169 |
| TiO2 | 275 | 262 | 162 |
| TiO2 | 300 | 199 | 127 |
| TiO2 | 325 | 322 | 173 |
| TiO2 | 350 | 327 | 187 |
| TiO2 | 375 | 120 | 77 |
| TiO2 | 400 | 359 | 199 |
| TiO2 | 425 | 345 | 194 |
| TiO2 | 450 | 353 | 169 |
| Y2O3 | 200 | 353 | 130 |

TABLE 1-continued

Electrochemical Characterization of Various Precursor Materials as a Function of Anneal Temperature

| Matrix/Coating Precursor | Annealing Temp (C.) | Initial Capacity (0.02 C, Cy1, mAh/g) | Reversible Capacity (0.05 C, Cy2, mAh/g) |
|---|---|---|---|
| Y2O3 | 325 | 279 | 104 |
| Y2O3 | 450 | 83 | 37 |
| Y2O3 | 575 | 80 | 30 |
| ZnF2 | 200 | 438 | 206 |
| ZnF2 | 325 | 372 | 191 |
| ZnF2 | 400 | 318 | 134 |
| ZnO | 200 | 210 | 95 |
| ZnO | 325 | 242 | 93 |
| ZnO | 400 | 194 | 44 |
| ZnO | 450 | 205 | 99 |
| ZnO | 575 | 151 | 71 |
| ZrO2 | 200 | 302 | 122 |
| ZrO2 | 325 | 288 | 129 |

Figure 4:
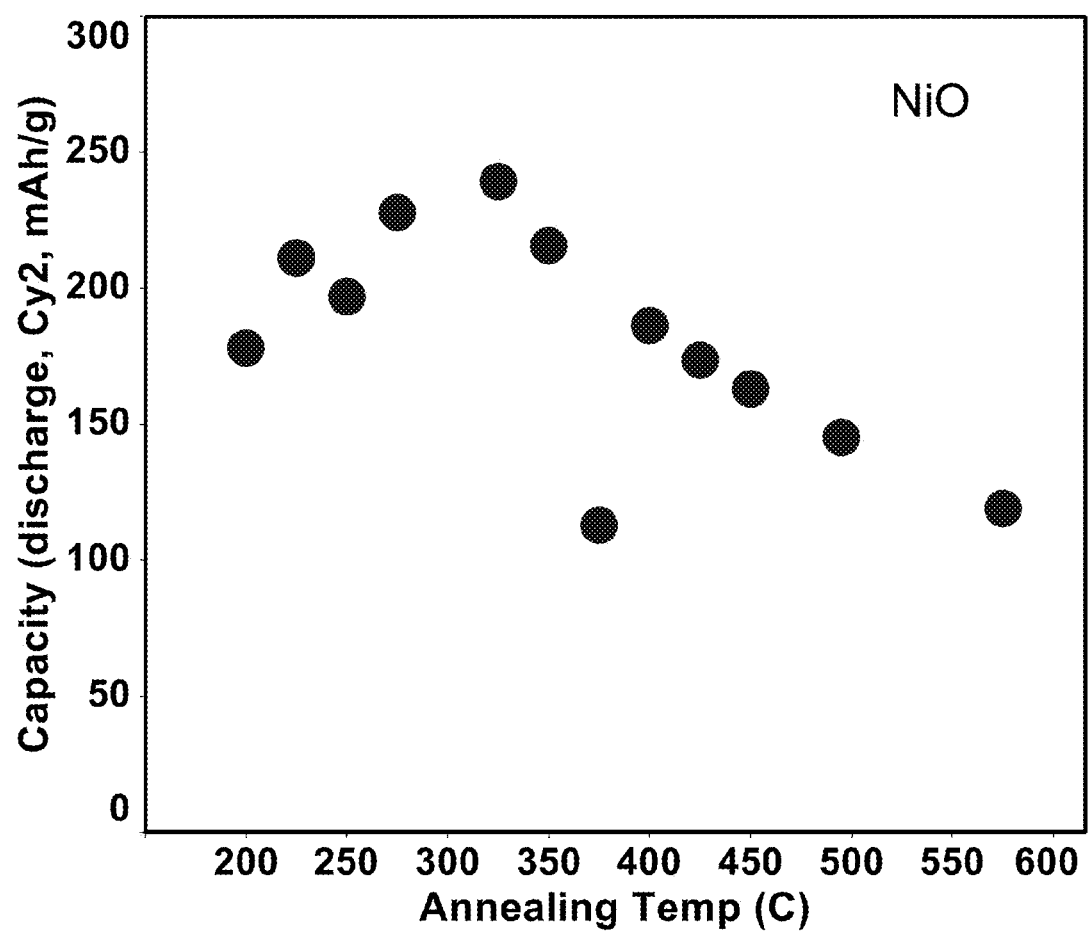
FIG. 4 illustrates second cycle discharge capacity for a hybrid cathode material used according to embodiments of the invention versus annealing temperature.

FIG. 4 illustrates the results of electrochemical characterization of certain embodiments disclosed herein. Specifically, the second cycle discharge capacity for cells containing a cathode formed from a metal fluoride and the matrix material treated at different temperatures. In this case, the metal fluoride active material is $CuF_2$ and the matrix material is NiO. FIG. 4 shows a peak for cycle 2 capacity at about 325 degrees C. for NiO matrices, with nearly 250 mAh/g discharge capacity.

Figure 5:
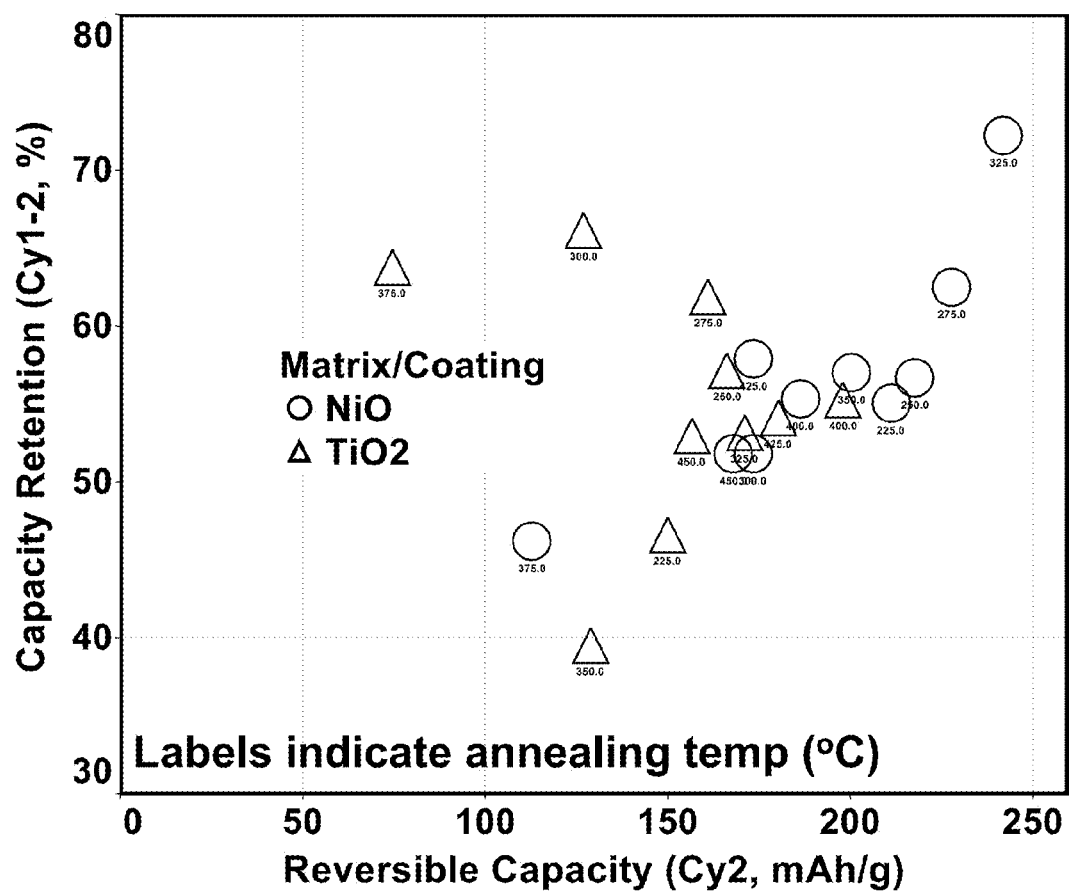
FIG. 5 illustrates second cycle the capacity retention and reversible capacity for cathode active materials formed from reacting 85 wt % $CuF_2$ with 15 wt % of certain metal oxides (in this case NiO or $TiO_2$) at certain annealing temperatures.

FIG. 5 illustrates the results of electrochemical characterization of certain embodiments disclosed herein, specifically, the second-cycle capacity retention and reversible capacity for cathode active materials formed from reacting 85 wt % $CuF_2$ with 15 wt % of certain metal oxides (in this case NiO or $TiO_2$) at certain annealing temperatures. The mixtures were milled at high energy for about 20 hours. The anneal temperatures ranged from about 225 degrees C. to about 450 degrees C. and the anneal time was 6 hours. The 325 degree C. anneal temperature for the NiO starting material generated the best performance. The cells used a Li anode and an electrolyte containing 1M LiPF6 in EC:EMC. The testing was performed at a rate of 0.02 C and over a voltage range of 2.0 V to 4.0 V.

Figure 6:
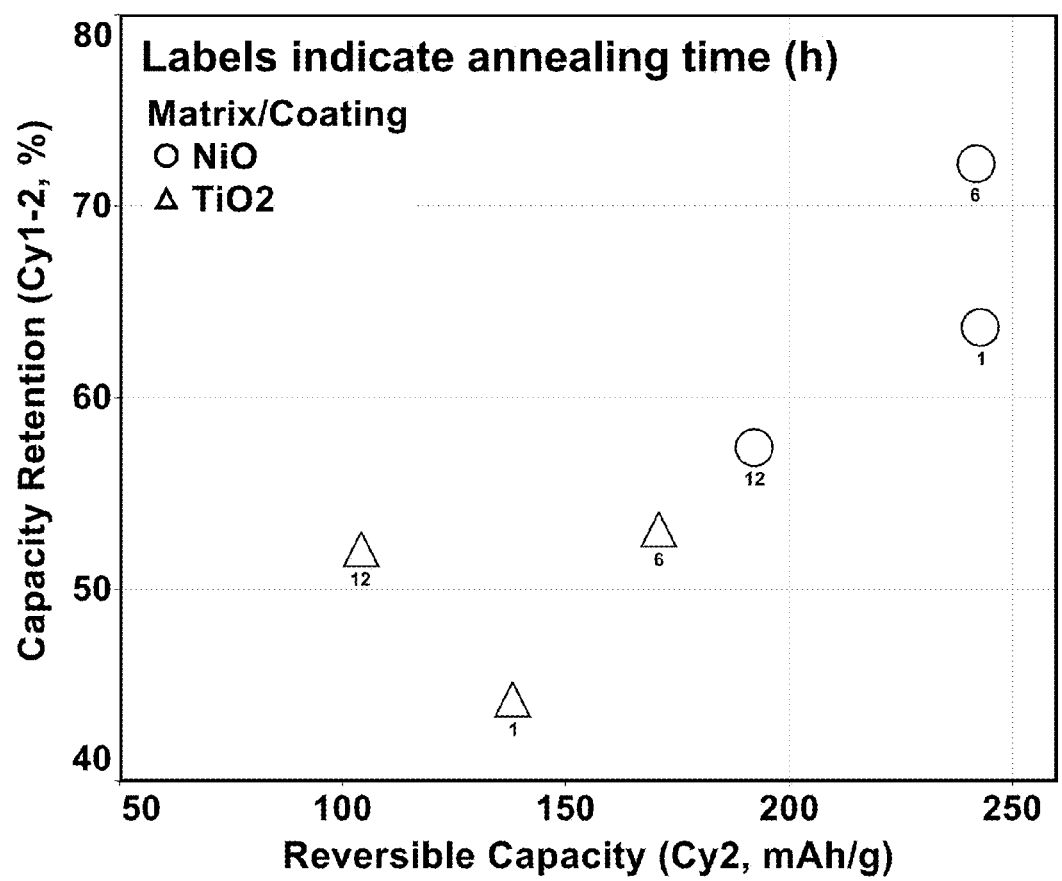
FIG. 6 illustrates the second-cycle capacity retention and reversible capacity for cathode active materials formed from reacting 85 wt % $CuF_2$ with 15 wt % of certain metal oxides (in this case NiO or $TiO_2$) for certain annealing times.

FIG. 6 illustrates the results of electrochemical characterization of certain embodiments disclosed herein, specifically, the second-cycle capacity retention and reversible capacity for cathode active materials formed from reacting 85 wt % $CuF_2$ with 15 wt % of certain metal oxides (in this case NiO or $TiO_2$) for certain annealing times. The mixtures were milled at high energy for about 20 hours. The anneal temperature was 325 degrees C. and the anneal time was 1 hour, 6 hours, or 12 hours. The 6 hour anneal time yielded the best results for both the NiO and $TiO_2$ starting materials, and the NiO starting material generated better performance. The cells used a Li anode and an electrolyte containing 1M LiPF6 in EC:EMC. The testing was performed at a rate of 0.02 C and over a voltage range of 2.0 V to 4.0 V.

Figure 7:
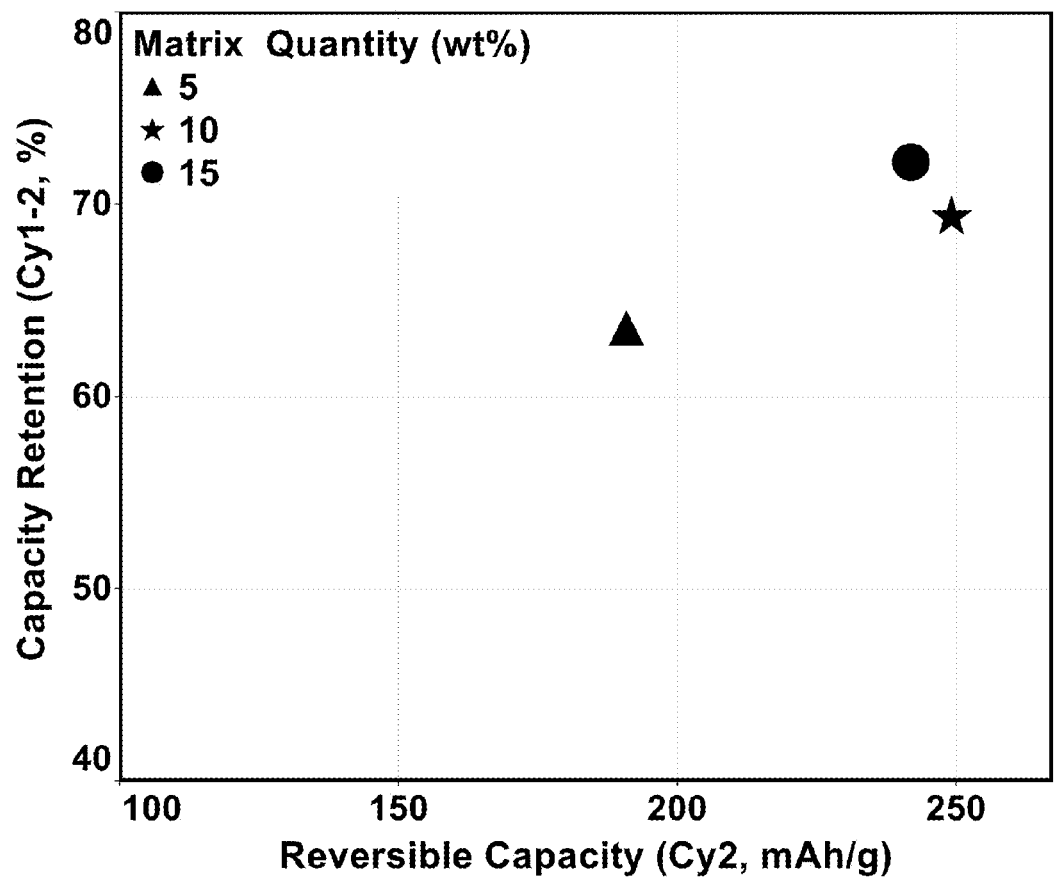
FIG. 7 illustrates the second-cycle capacity retention and reversible capacity for cathode active materials formed from reacting 85 wt %, 90 wt %, or 95 wt % $CuF_2$ with 5 wt %, 10 wt %, 15 wt % of NiO.

FIG. 7 illustrates the results of electrochemical characterization of certain embodiments disclosed herein, specifically, the second-cycle capacity retention and reversible capacity for cathode active materials formed from reacting 85 wt %, 90 wt %, or 95 wt % $CuF_2$ with 5 wt %, 10 wt %, 15 wt % of NiO. The mixtures were milled at high energy for about 20 hours. The anneal temperature was 325 degrees C. and the anneal time was 6 hours. Using 10 wt % or 15 wt % of the NiO starting material generated better performance. The cells used a Li anode and an electrolyte containing 1M LiPF6 in EC:EMC. The testing was performed at a rate of 0.02 C and over a voltage range of 2.0 V to 4.0 V.

Figure 8:
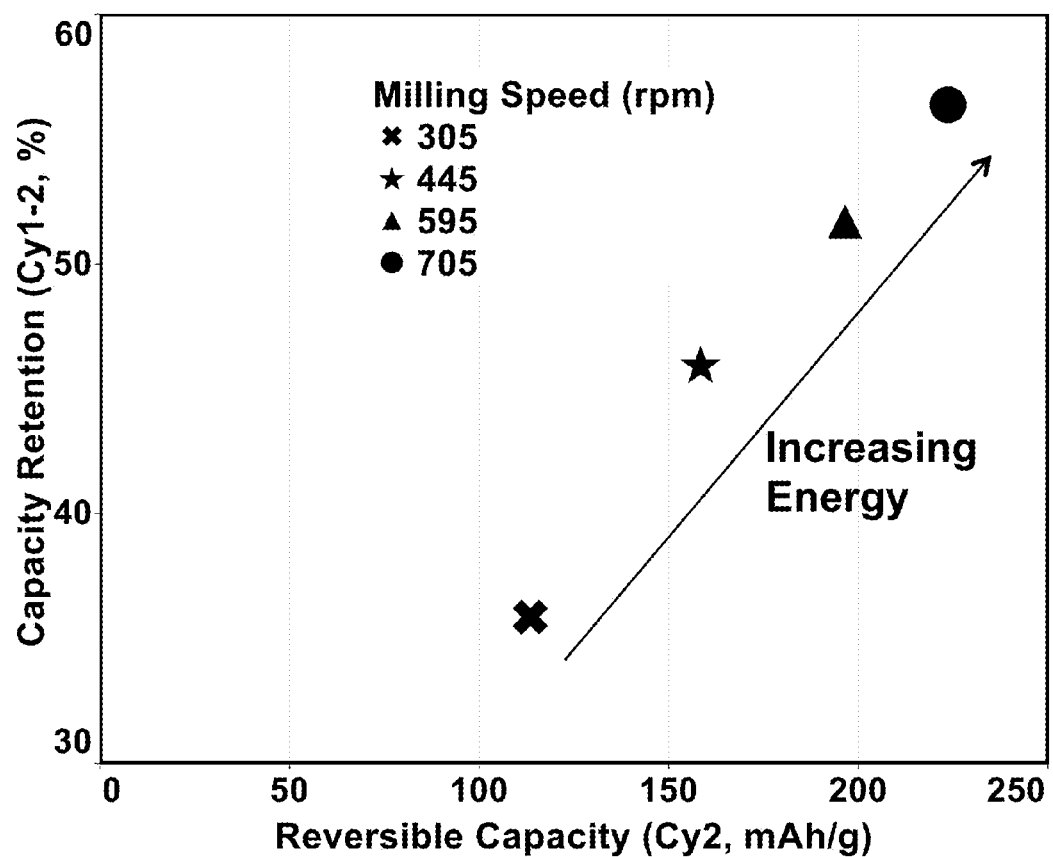
FIG. 8 illustrates the second-cycle capacity retention and reversible capacity for cathode active materials formed from reacting 85 wt %, $CuF_2$ with 15 wt % of NiO as a function of milling energy.

FIG. 8 illustrates the results of electrochemical characterization of certain embodiments disclosed herein, specifically, the second-cycle capacity retention and reversible capacity for cathode active materials formed from reacting 85 wt %, $CuF_2$ with 15 wt % of NiO. The mixtures were milled at various energies comparable to milling on a Fritch Pulverisette 7 Planatery Mill at 305, 445, 595, and 705 RPM for about 20 hours. The anneal temperature was 325 degrees C. and the anneal time was 6 hours. Performance improves with increasing milling energy, suggesting that intimate physical interaction of the materials is required. The cells used a Li anode and an electrolyte containing 1M LiPF6 in EC:EMC. The testing was performed at a rate of 0.05 C and over a voltage range of 2.0 V to 4.0 V.

Figure 9:
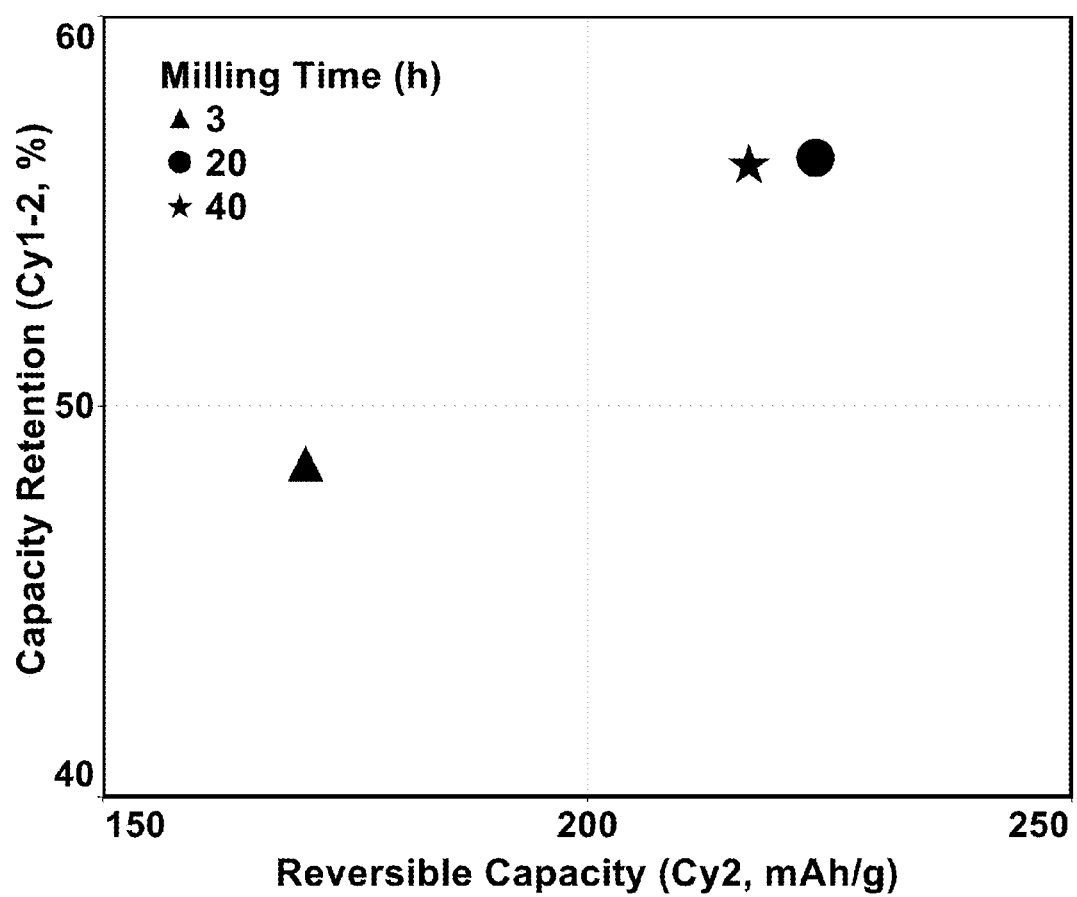
FIG. 9 illustrates the second-cycle capacity retention and reversible capacity for cathode active materials formed from reacting 85 wt %, $CuF_2$ with 15 wt % of NiO as a function of milling time.

FIG. 9 illustrates the results of electrochemical characterization of certain embodiments disclosed herein, specifically, the second-cycle capacity retention and reversible capacity for cathode active materials formed from reacting 85 wt %, $CuF_2$ with 15 wt % of NiO. The mixtures were milled for various times (3 hours, 20 hours, or 40 hours) at a high energy (comparable to 705 RPM on Fritch Pulverisette 7). The anneal temperature was 325 degrees C. and the anneal time was 6 hours. Performance does not improve after 20 hours of milling. The cells used a Li anode and an electrolyte containing 1M LiPF6 in EC:EMC. The testing was performed at a rate of 0.05 C and over a voltage range of 2.0 V to 4.0 V.

Figure 10:
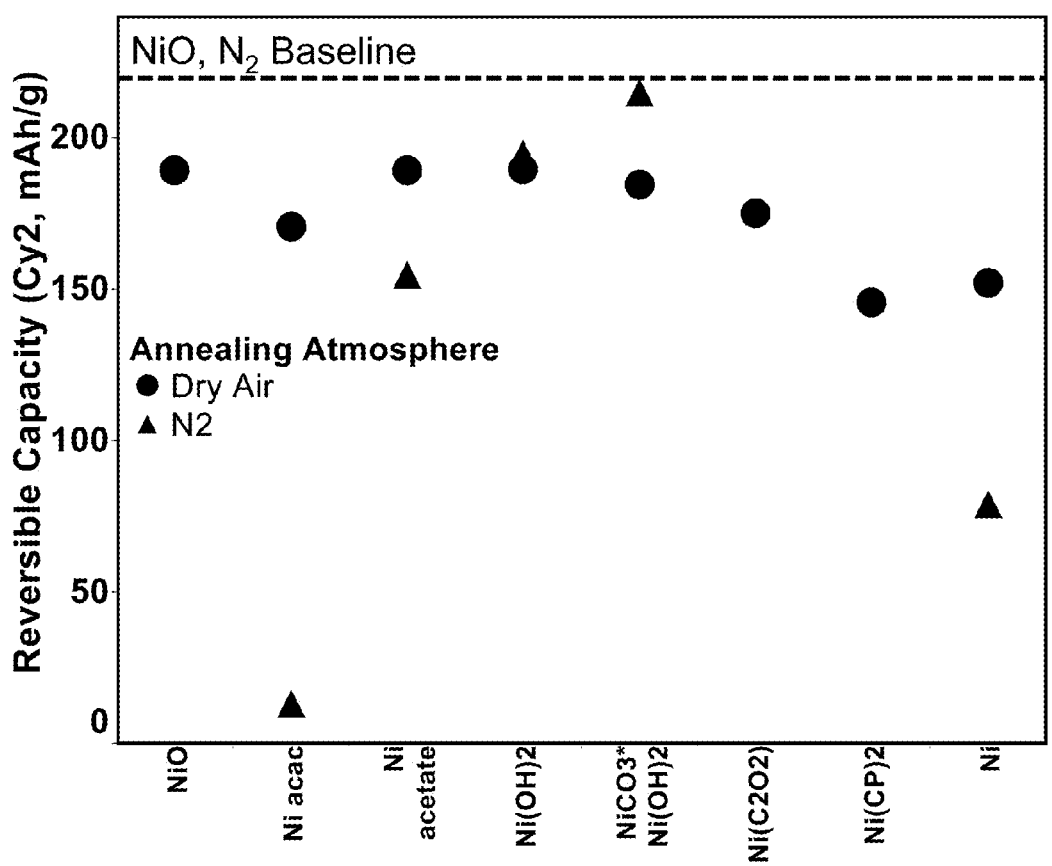
FIG. 10 illustrates the second cycle reversible capacity measured for various starting materials used to react with $CuF_2$.
Figure 13:
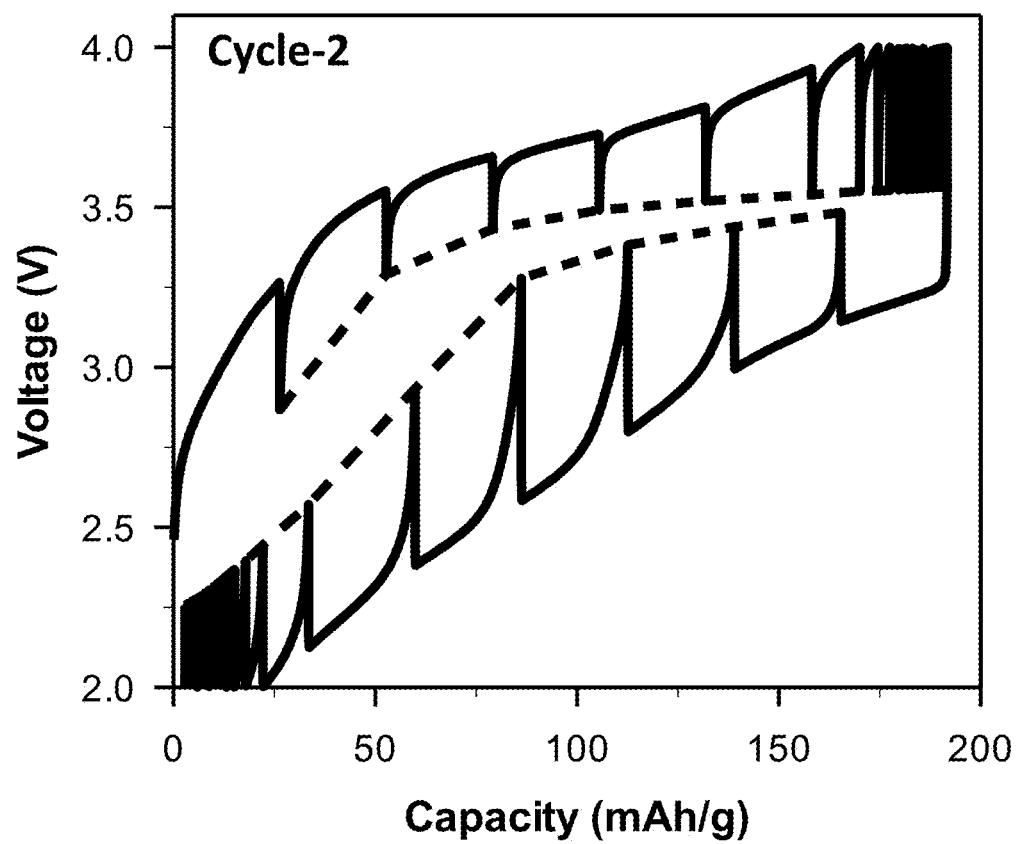
FIG. 13 illustrates a galvanostatic intermittent titration technique measurement for cathode active materials formed from reacting 85 wt %, $CuF_2$ with 15 wt % of NiO.

FIG. 10 illustrates the results of electrochemical characterization of certain embodiments disclosed herein. Specifically, FIG. 13 shows the second cycle reversible capacity measured for various starting materials used to react with $CuF_2$. The starting materials include NiO, nickel(II) acetylacetonate, nickel acetate, nickel hydroxide, $NiCO_3*Ni(OH)_2$, $Ni(C_2O_2)$, $Ni(CP)_2$, and Ni. In some instances, the starting materials react to form a new phase. The materials react with the surface of the $CuF_2$ particles. Additionally, the anneal atmosphere was either N2 or dry air. The precursor-type starting materials decompose to NiO (although this depends on the atmosphere for some precursors) at or below the annealing temperatures used for the reaction. The precursors that are soluble or have low boiling points can enable solution or vapor deposition processing methods. The cells used a Li anode and an electrolyte containing 1M LiPF6 in EC:EMC. The testing was performed at a rate of 0.05 C and over a voltage range of 2.0 V to 4.0 V. Several materials show similar performance to the NiO baseline.

Figure 11:
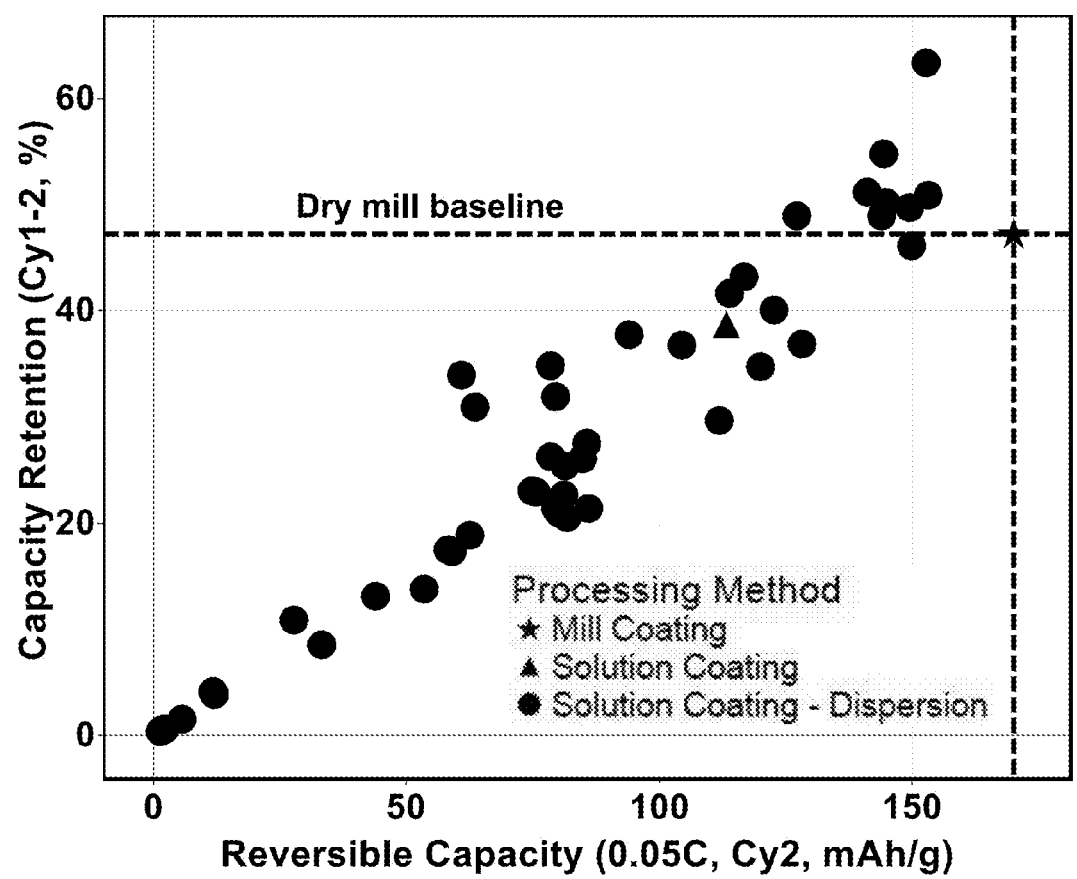
FIG. 11 illustrates the second-cycle capacity retention and reversible capacity for cathode active materials formed from reacting $CuF_2$ with nickel(II) acetylacetonate using various processing conditions.

FIG. 11 illustrates the results of electrochemical characterization of certain embodiments disclosed herein, specifically, the second-cycle capacity retention and reversible capacity for cathode active materials formed from reacting $CuF_2$ with nickel(II) acetylacetonate using various processing conditions. In some cases, the $CuF_2$ was dispersed using methods described herein. The coatings were applied using mill coating techniques (that is, agitating the mixture in a milling apparatus) or by solution coating techniques (including solution coating driven by physisorption). All samples were annealed under dry air. The cells used a Li anode and an electrolyte containing 1M LiPF6 in EC:EMC. The testing was performed at a rate of 0.05 C and over a voltage range of 2.0 V to 4.0 V. Testing demonstrates that solution coating methods can provide similar performance to the mill coating techniques.

Figure 12:
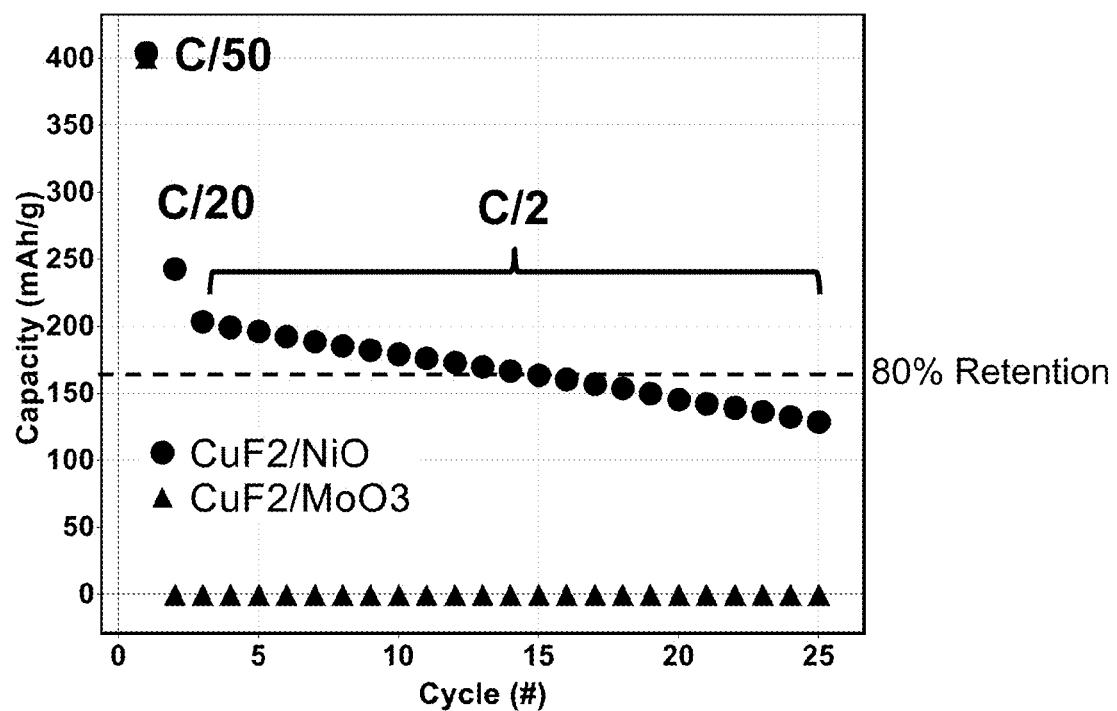
FIG. 12 illustrates the capacity as a function of cycle for cathode active materials formed from reacting 85 wt %, $CuF_2$ with 15 wt % of NiO and for a control material.

FIG. 12 illustrates the results of electrochemical characterization of certain embodiments disclosed herein, specifically, the capacity as a function of cycle for cathode active materials formed from reacting 85 wt %, $CuF_2$ with 15 wt % of NiO and for a control material. The NiO/$CuF_2$ mixture was milled at high energy for about 20 hours. The anneal temperature was 325 degrees C. and the anneal time was 6 hours. The cells used a Li anode and an electrolyte containing 1M LiPF6 in EC:EMC. The testing was performed at a cycle 1 rate of 0.02 C, a cycle 2 rate of 0.05 C, and a cycle 3 through cycle 25 rate of 0.5 C and over a voltage range of 2.0 V to 4.0 V. With the reacted NiO/$CuF_2$ as the active material, the cell cycles reversibly for extended cycling with capacity greater than 100 mAh/g for 25 cycles. Further, the reacted NiO/$CuF_2$ active material demonstrates retention of 80% of cycle 3 capacity as far out as cycle 15. The control material, which was prepared according to the process described in Badway, F. et al., Chem. Mater., 2007, 19, 4129, does not demonstrate any rechargeable capacity. Thus, the material prepared according to embodiments described herein is significantly superior to known materials processed according to known methods.

FIG. 13 illustrates the results of electrochemical characterization of certain embodiments disclosed herein, specifically, a galvanostatic intermittent titration technique (GITT) measurement for cathode active materials formed from reacting 85 wt %, $CuF_2$ with 15 wt % of NiO and for a control material. The NiO/$CuF_2$ mixture was milled at high energy for about 20 hours. The anneal temperature was 325 degrees C. and the anneal time was 6 hours. The cells used a Li anode and an electrolyte containing 1M LiPF6 in EC:EMC. The testing was performed over a voltage range of 2.0 V to 4.0 V at a rate of 0.1 C and with a 10 hour relaxation time. The GITT measurement relaxation points show low voltage hysteresis (about 100 mV), which indicate that the overpotential and/or underpotential are likely caused by kinetic and not thermodynamic limitations. This is consistent with other properties and characteristics observed for the reacted NiO/$CuF_2$ active material.

Figure 14:
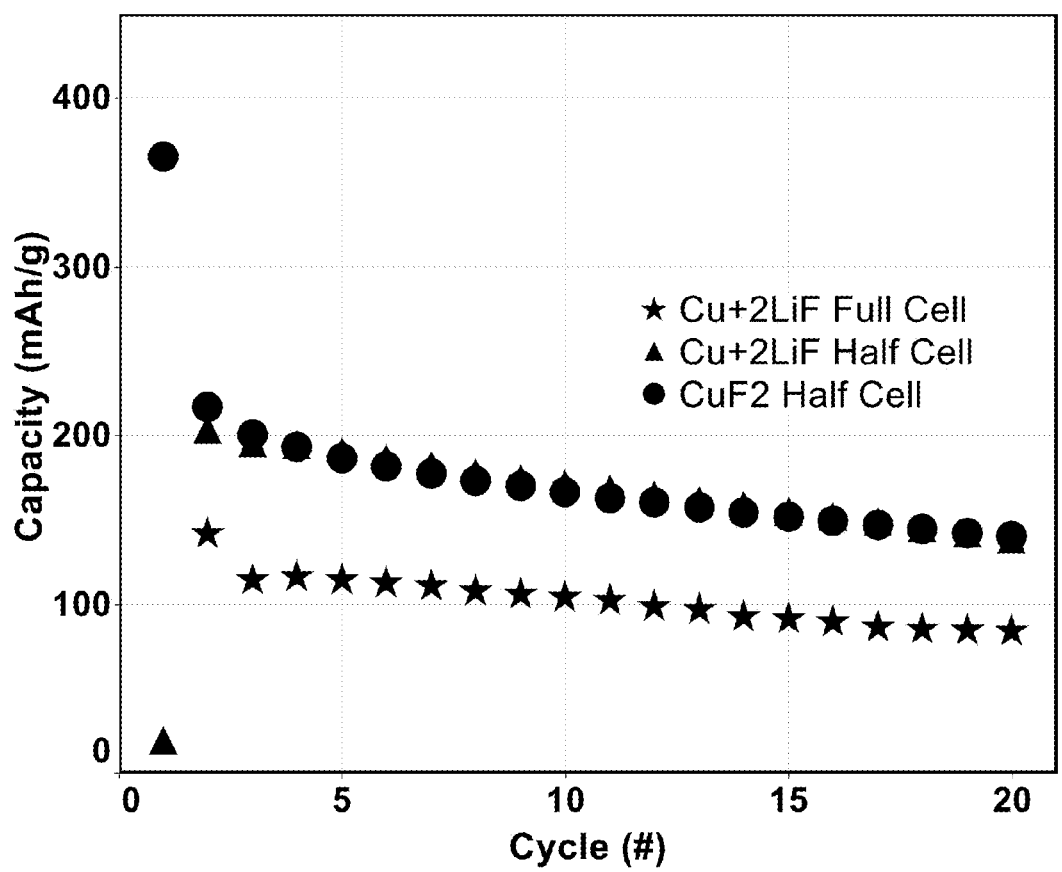
FIG. 14 illustrates the capacity of full cells and half cells as a function of cycle for cathode active materials formed from reacting 85 wt %, $CuF_2$ with 15 wt % of NiO.

FIG. 14 illustrates the results of electrochemical characterization of certain embodiments disclosed herein, specifically, the capacity of full cells and half cells as a function of cycle for cathode active materials formed from reacting 85 wt %, $CuF_2$ with 15 wt % of NiO. The NiO/$CuF_2$ mixture was milled at high energy for about 20 hours. The anneal temperature was 325 degrees C. and the anneal time was 6 hours. The label "Cu+2LiF" indicated that the NiO/$CuF_2$ electrode was lithiated by pressing Li foil to $CuF_2$ electrode in the presence of electrolyte as described above. The other half cell was lithiated electrochemically in the initial cycles. The cells used a Li anode and an electrolyte containing 1M LiPF6 in EC:EMC. The testing was performed over a voltage range of 2.0 V to 4.0 V. Half cell performance is essentially identical between the two lithiation methods after cycle 2, while full cell shows additional irreversible capacity loss as compared to the half cells but similar capacity retention.

Figure 15:
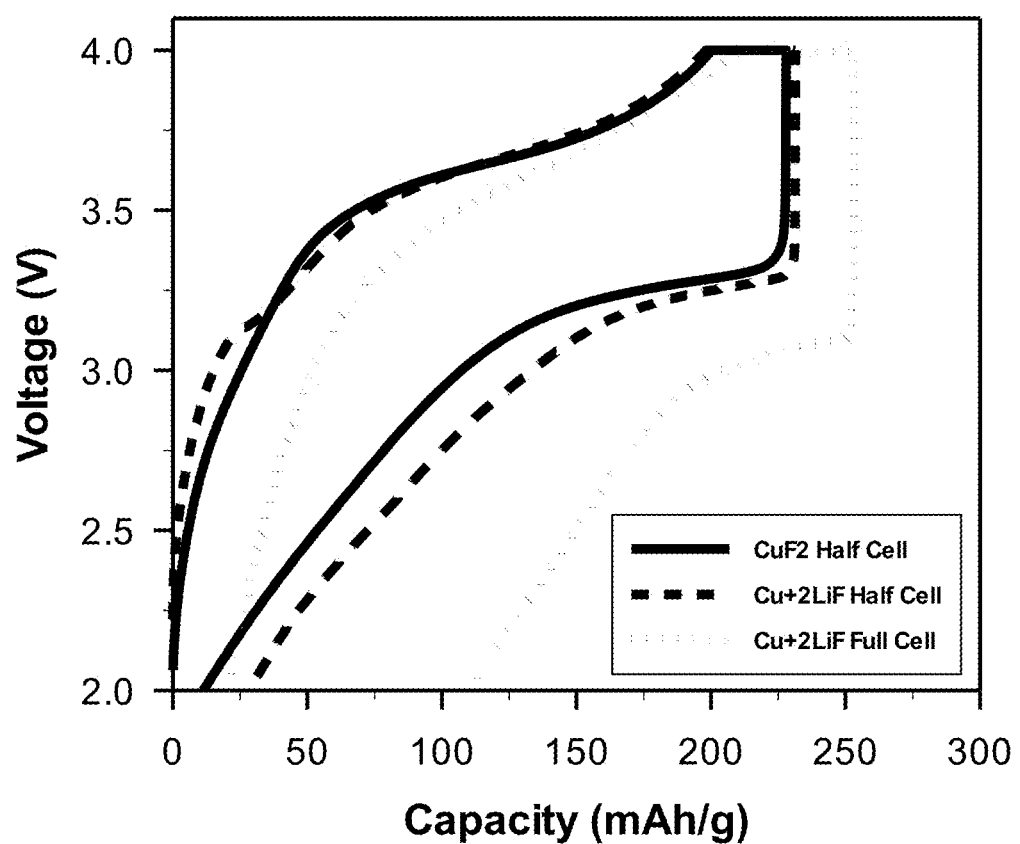
FIG. 15 illustrates voltage traces of the full cell and half cells prepared as described in relation to FIG. 14.

FIG. 15 illustrates the results of electrochemical characterization of certain embodiments disclosed herein, specifically, the voltage traces of the full cell and half cells prepared as described in relation to FIG. 14. The full cell has similar charge capacity to the half cells, but larger irreversible capacity loss and lower discharge voltage (which can indicate increased cell impedance). FIG. 15 demonstrates that the full cell has about 250 mAh/g of reversible capacity and about 500 mV hysteresis between charge and discharge plateau voltages.

Figure 16:
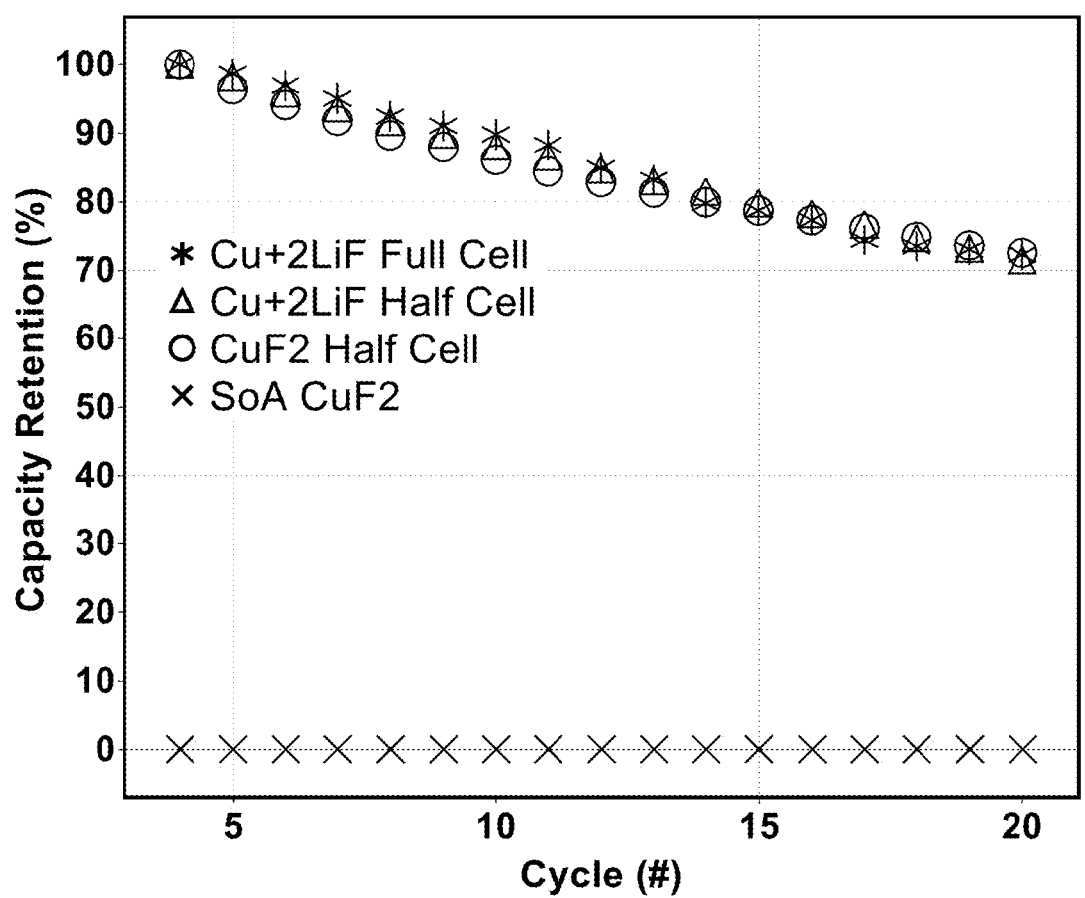
FIG. 16 illustrates the capacity retention of full cells and half cells as a function of cycle for cathode active materials formed from reacting 85 wt %, $CuF_2$ with 15 wt % of NiO.

FIG. 16 illustrates the results of electrochemical characterization of certain embodiments disclosed herein, specifically, the capacity retention of full cells and half cells as a function of cycle for cathode active materials formed from reacting 85 wt %, $CuF_2$ with 15 wt % of NiO. The results from a control material are also depicted. The full cell and half cells were prepared as described in relation to FIG. 14. The cells used a Li anode and an electrolyte containing 1M LiPF6 in EC:EMC. The testing was performed at a cycle 1 rate of 0.1 C and over a voltage range of 2.0 V to 4.0 V. The capacity retention is essentially identical for the full and half cells of the NiO/$CuF_2$ active material. The control material shows essentially no rechargeable capacity.

Figure 17:
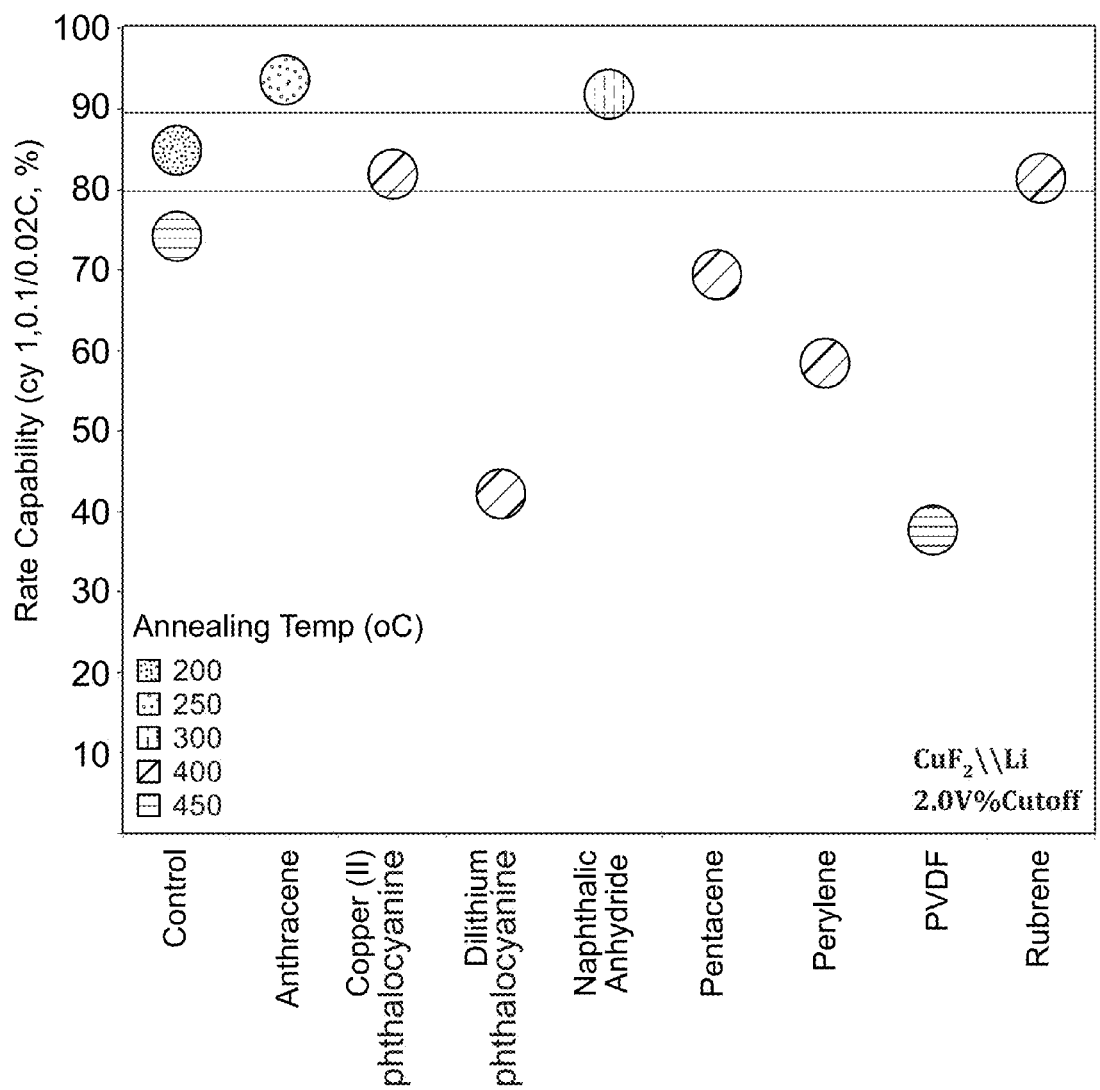
FIG. 17 depicts the results of testing of an electrochemical cell containing metal fluoride active materials coated according to certain embodiments of the invention as compared to control. Certain coated metal fluoride materials demonstrate improved rate capability as compared to control while other coated metal fluoride materials demonstrate diminished rate capability as compared to control.

As depicted in FIG. 17, $CuF_2$ coated with anthracene and naphthalic anhydride showed an improvement over uncoated $CuF_2$. Anthracene coated $CuF_2$ (annealed at about 250 degrees C.) demonstrated about 94% rate retention and naphthalic anhydride coated $CuF_2$ (annealed at about 300 degrees C.) demonstrated about 92% rate retention at first cycle when comparing 0.1 C rate and 0.02 C rate discharge. Other coatings on $CuF_2$, such as PVDF annealed at about 450 degrees C., demonstrated inferior rate capability as compared to uncoated $CuF_2$.

Figure 18:
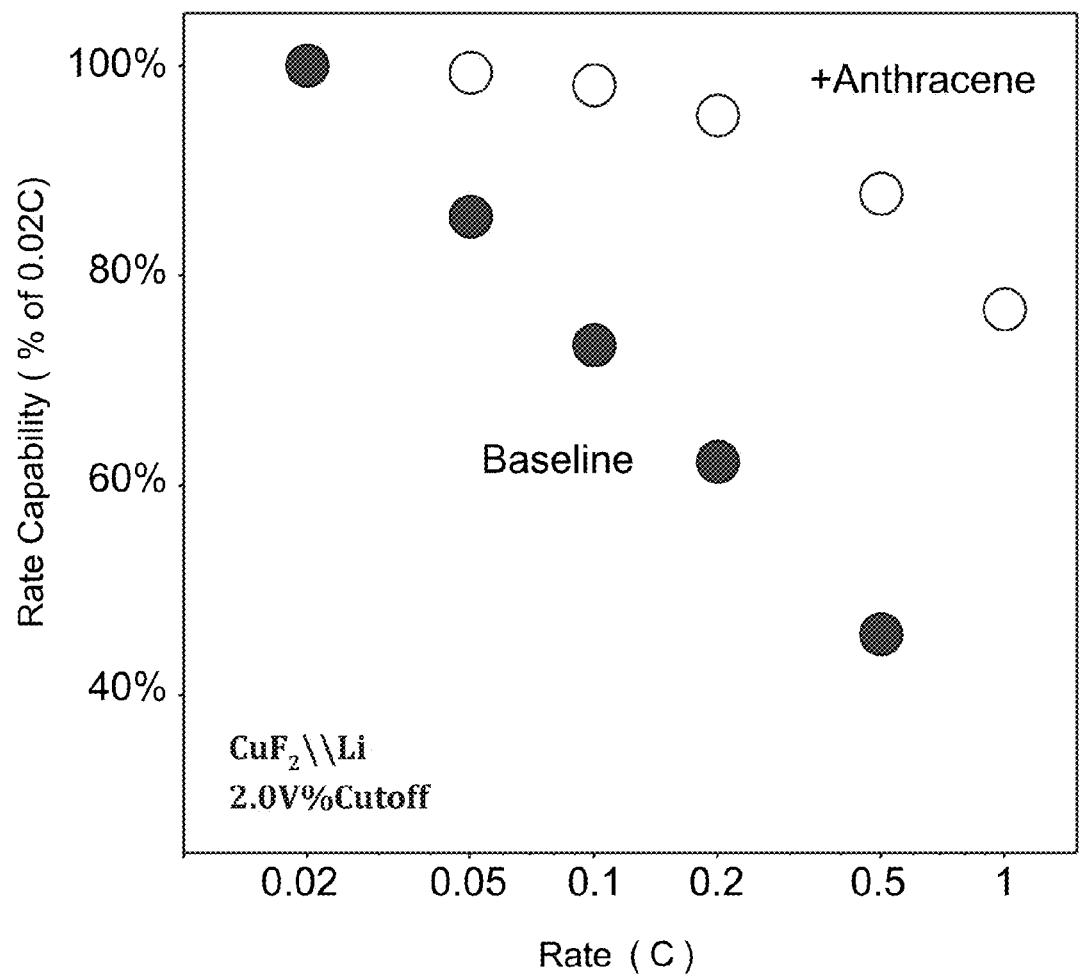
FIG. 18 depicts the results of testing of an electrochemical cell containing metal fluoride active materials coated according to certain embodiments of the invention as compared to control. A $CuF_2/MoO_3$ composite material coated with anthracene demonstrated improved rate performance as compared to an uncoated $CuF_2/MoO_3$ composite material.

As depicted in FIG. 18, an anthracene coated $CuF_2$/$MoO_3$ composite material demonstrates improvement in rate performance as compared to a baseline uncoated $CuF_2$/$MoO_3$ composite material for rates from 0.02 C to 10. In particular, the anthracene coated material showed significant improvement in rate performance at higher discharge rates as compared to the uncoated control material.

Figure 19:
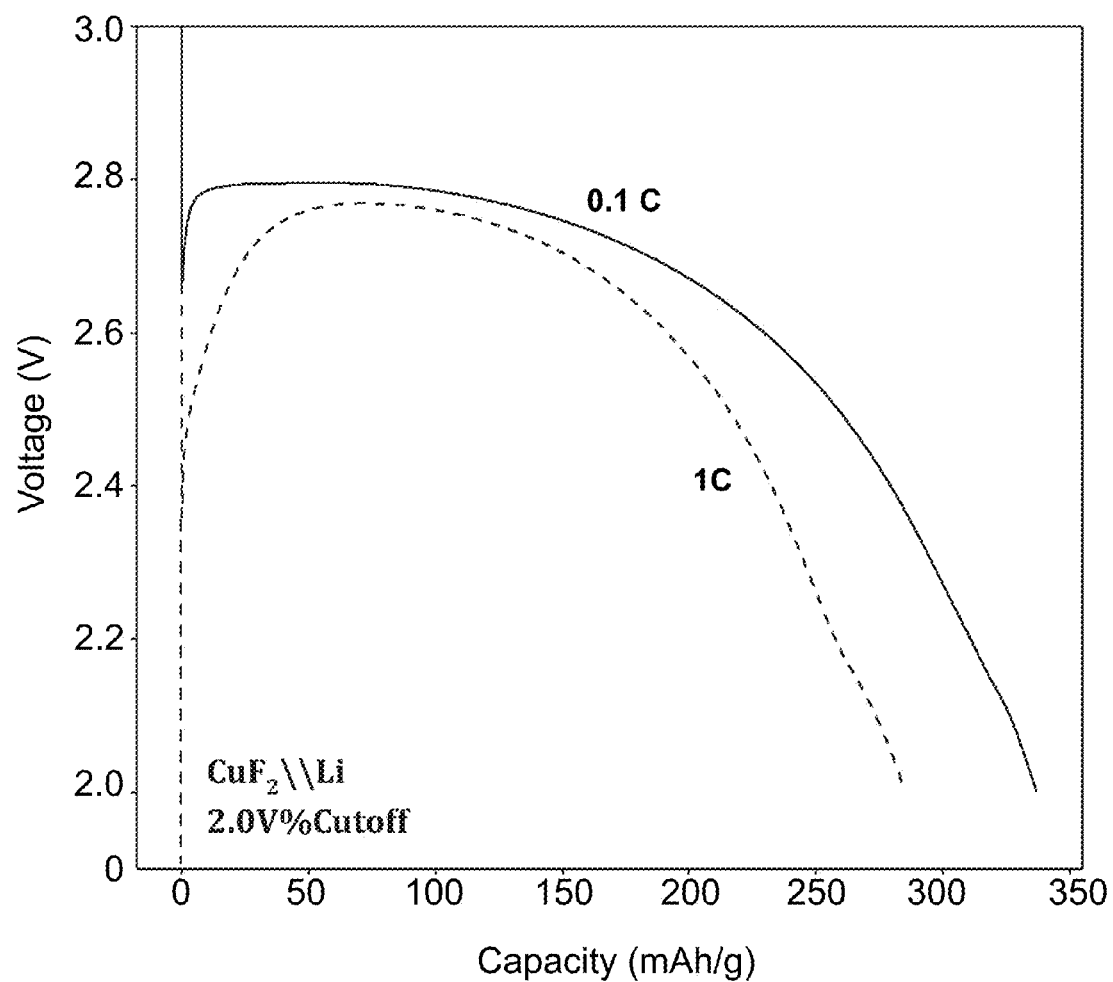
FIG. 19 depicts the results of testing of an electrochemical cell containing metal fluoride active materials coated according to certain embodiments of the invention. A metal fluoride material coated with anthracene demonstrated a minimal voltage drop from low rate to high rate of discharge.

As depicted in FIG. 19, there is a low voltage drop from 0.1 C to 10 rate for an anthracene coated material. Further, the coated material shows capacity of 285 mAh/g at 10 rate.

Figure 20:
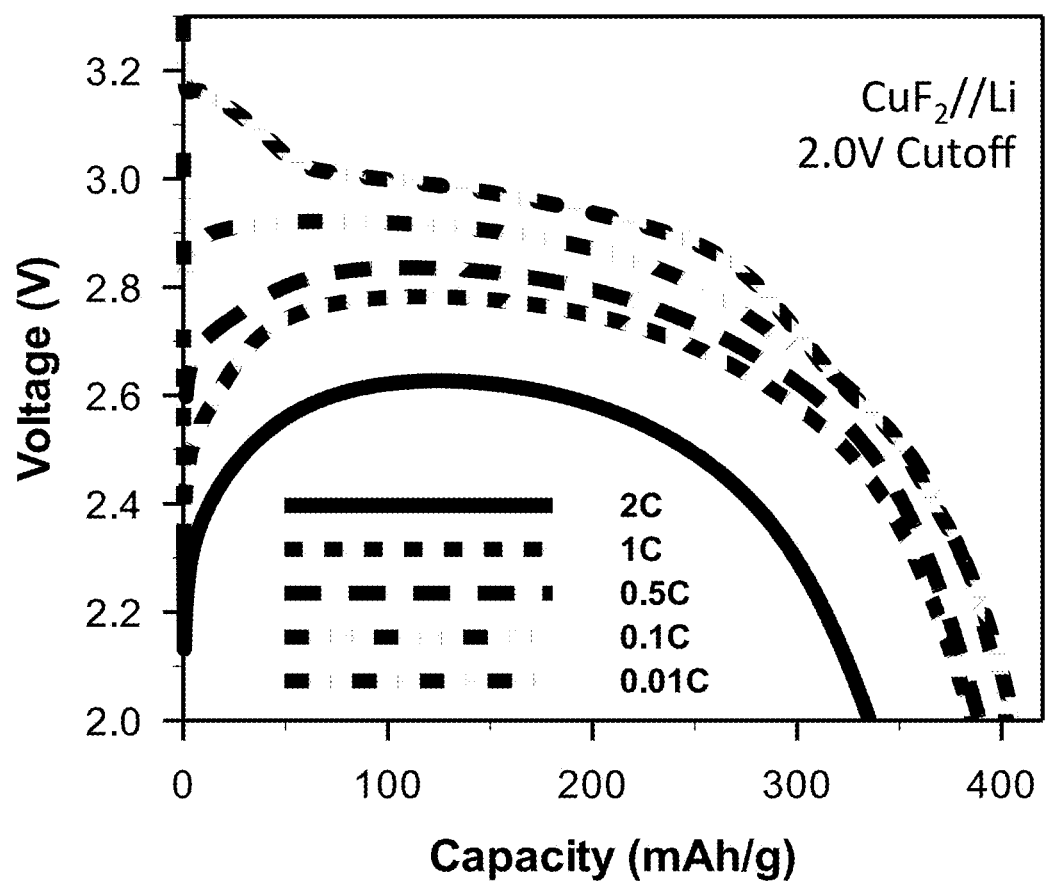
FIG. 20 depicts the results of testing of an electrochemical cell containing metal fluoride active materials coated according to certain embodiments of the invention, demonstrating a low voltage drop from low rate to high rate of discharge and improved energy density.

FIG. 20 depicts further rate improvements in a $CuF_2$/$MoO_3$ composite material coated according to embodiments of the invention. The capacity at 10 rate is greater than about 375 mAh/g and at lower rates the capacity approaches or exceeds 400 mAh/g. Further, FIG. 20 demonstrates a low voltage drop from 0.01 C to 10 rate due to the conductive coating.

Figure 21:
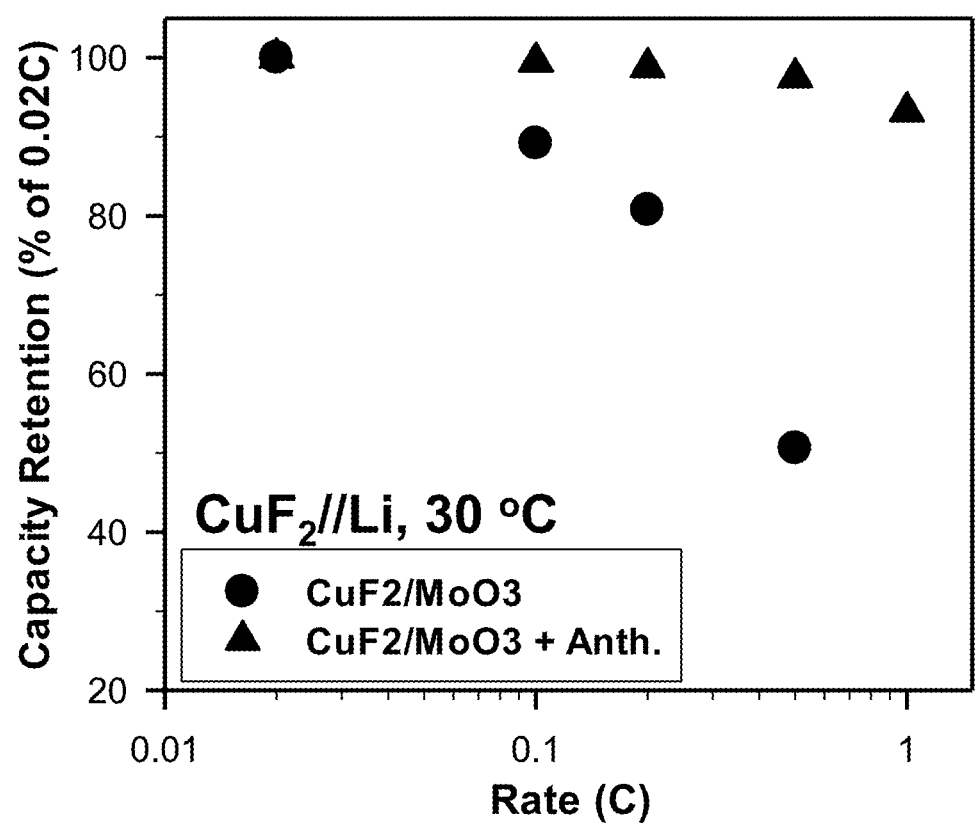
FIG. 21 depicts the results of testing of an electrochemical cell containing metal fluoride active materials coated according to certain embodiments of the invention.

FIG. 21 depicts the capacity retention as compared to the rate for the baseline $CuF_2$/$MoO_3$ composite and the imporved anthracene coated material. The optimized material showed significant improvement in rate performance with about 94% retention at 10 rate.

Notably, certain hybrid metal fluoride active materials disclosed herein can be coated with the conductive coating precursor materials also disclosed herein to yield a comparatively high energy rechargeable cathode material. For example, Table 2 lists the results of testing a NiO/$CuF_2$ active material coated with various intrinsically conductive precursors.

TABLE 2

Electrochemical Characterization of NiO/$CuF_2$ Hybrid Active Materials Coated with Conductive Precursors

| Coating Precursor | Reversible Capacity (mAh/g) | Rate Capability (cy 1, 1/0.02 C, %) |
|---|---|---|
| — | 214 | 70 |
| Octafluoronaphthalene | 211 | 78 |
| N,N'-Dioctyl-3,4,9,10-perylenedicarboximide | 198 | 84 |
| Perylene-3,4,9,10-tetracarboxylic dianhydride | 172 | 52 |
| PVDF | 153 | 84 |
| Perylene | 118 | 64 |
| 29H,31H-Phthalocyanine | 56 | 3 |

TABLE 2-continued

Electrochemical Characterization of NiO/CuF$_2$ Hybrid Active Materials Coated with Conductive Precursors

| Coating Precursor | Reversible Capacity (mAh/g) | Rate Capability (cy 1, 1/0.02 C, %) |
|---|---|---|
| Tri-1-naphthylphosphine | 29 | 43 |
| 1,8-Naphthalic anhydride | 22 | 87 |
| 5,10,15,20-Tetrakis(pentafluorophenyl)porphyrin | 21 | 91 |
| Pentacene | 18 | 86 |
| Pyrene | 15 | 44 |
| 1,6-Diphenyl-1,3,5-hexatriene | 15 | 89 |
| 2-BENZOYLDIBENZO-P-DIOXIN | 15 | 42 |
| 7,7,8,8-Tetracyanoquinodimethane | 14 | 86 |
| 4-(2,3-Dihydro-1,3-dimethyl-1H-benzimidazol-2-yl)-N,N-dimethylbenzenamine | 13 | 0 |
| Dilithium phthalocyanine | 13 | 81 |
| Benz[b]anthracene | 11 | 91 |
| Anthracene | 11 | 87 |
| Copper(II) phthalocyanine | 10 | 72 |
| Rubrene | 7 | 86 |

Table 2 demonstrates that not all materials are capable of yielding a material that has reversible capacity. The top performing coating precursors include octafluoronaphthalene and N,N'-dioctyl-3,4,9,10-perylenedicarboximide. Without being bound by a particular theory or mechanism of action, the coating precursors that remain comparatively stable at the temperatures required to react CuF$_2$ and NiO perform better than those that completely decompose at that reaction temperature. Generally speaking, balancing the reaction temperature required to form the hybrid metal fluoride active material with the decomposition temperature of the coating material can yield the desired improved high energy cathode material. For example, other hybrid active material precursors (that is, other than NiO) can yield the desired result if they react at a temperature where the conductive coating precursor does not fully decompose.

Various materials disclosed herein demonstrated improved performance as compared to control. In certain testing, naphthalic anhydride demonstrated a 3% capacity improvement, power performance improvement, and improved power stability over control. In certain testing, perylene demonstrated a 9% voltage improvement over control. In certain testing, rubrene demonstrated superior capacity at high voltage as compared to control.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrode for an electrochemical cell, comprising:
   a fluorine-containing active electrode material comprising particles having a first phase including a metal fluoride material and a coating on the particle having a second phase including a metal complex material;
   a binder material; and
   an intrinsically conductive coating covalently attached to the active electrode material wherein the coating is formed from an organic coating compound comprising a conjugated core.

2. The electrode of claim 1 wherein the organic coating compound comprises a conjugated core in which at least 90% of the carbon atoms are sp or sp2 hybridized.

3. The electrode of claim 1 wherein the metal fluoride material comprises copper fluoride.

4. The electrode of claim 1 wherein the metal complex material comprises a metal oxide.

5. The electrode of claim 4 wherein the metal oxide comprises a nickel oxide.

6. The electrode of claim 1 wherein the metal complex material comprises a metal fluoride.

7. The electrode of claim 1 wherein the metal complex material comprises a metal phosphate.

8. The electrode of claim 1 wherein the organic coating compound is octafluoronaphthalene.

9. The electrode of claim 1 wherein the organic coating compound is N,N'-dioctyl-3,4,9,10-perylenedicarboximide.

10. The electrode of claim 1 wherein the intrinsically conductive coating is formed at a temperature below 450 degrees C.

11. The electrode of claim 1 wherein the intrinsically conductive coating is a network of conjugated cores.

12. The electrode of claim 1 wherein the electrode is characterized as having reversible capacity.

13. The electrode of claim 1 wherein the active electrode material comprises particles with a grain size greater than 100 nm.

14. The electrode of claim 1 wherein the active electrode material comprises particles with a grain size greater than 130 nm.

15. The electrode of claim 1 wherein the metal oxide is selected from the group consisting of MoO$_3$, MoO$_2$, NiO, CuO, VO$_2$, V$_2$O$_5$, TiO$_2$, and combinations thereof.

16. A method of making an electrode, comprising:
   reacting a metal fluoride material and a metal complex material to form a fluorine-containing active electrode material comprising particles having a first phase including a metal fluoride material and a coating on the particle having a second phase including a metal complex material;
   mixing the formed active electrode material and an intrinsic organic conductor comprising a conjugated core; and
   heating the mixture to form a conductive coating on the active electrode material at a temperature that limits degradation of the active electrode material.

17. The method of claim 16 wherein the metal fluoride material comprises copper fluoride.

18. The method of claim 16 wherein the metal complex material comprises a metal oxide.

19. The method of claim 18 wherein the metal oxide comprises a nickel oxide.

20. The method of claim 16 wherein the metal complex material comprises a metal fluoride.

21. The method of claim 16 wherein the metal complex material comprises a metal phosphate.

22. The method of claim 16 wherein the organic conductor is octafluoronaphthalene.

23. The method of claim 16 wherein the organic conductor is N,N'-dioctyl-3,4,9,10-perylenedicarboximide.

24. The method of claim 16 wherein the conductive coating is formed at a temperature below 450 degrees C.

* * * * *